(12) United States Patent
Givant et al.

(10) Patent No.: US 12,481,578 B2
(45) Date of Patent: Nov. 25, 2025

(54) DATA LOSS PROTECTION FOR MEMORY SYSTEMS AND DEVICES

(71) Applicant: Infineon Technologies LLC, San Jose, CA (US)

(72) Inventors: Amichai Givant, Rosh-Ha'ain (IL); Yoav Yogev, Mazkeret-Batya (IL); Shivananda Shetty, Fremont, CA (US); Stefano Amato, San Jose, CA (US); Itzic Cohen, Netanya (IL); Idan Koren, Kiryat Ono (IL); Yair Sofer, Tel-Aviv (IL)

(73) Assignee: Infineon Technologies LLC, San Jose, CA (US)

( * ) Notice: Subject to any disclaimer, the term of this patent is extended or adjusted under 35 U.S.C. 154(b) by 63 days.

(21) Appl. No.: 18/379,331

(22) Filed: Oct. 12, 2023

(65) Prior Publication Data

US 2024/0296115 A1 Sep. 5, 2024

Related U.S. Application Data

(60) Provisional application No. 63/449,644, filed on Mar. 3, 2023.

(51) Int. Cl.
*G06F 11/00* (2006.01)
*G06F 11/07* (2006.01)
*G06F 12/02* (2006.01)

(52) U.S. Cl.
CPC .......... *G06F 12/023* (2013.01); *G06F 11/073* (2013.01); *G06F 11/0769* (2013.01)

(58) Field of Classification Search
CPC ......... G06F 11/02082; G06F 11/02064; G06F 11/02056; G06F 11/2082; G06F 11/2064; G06F 11/2056
See application file for complete search history.

(56) References Cited

U.S. PATENT DOCUMENTS

| | | | | |
|---|---|---|---|---|
| 10,423,783 | B2 * | 9/2019 | Pavlas | G06F 11/1441 |
| 11,204,841 | B2 * | 12/2021 | Frolikov | G06F 1/3225 |
| 11,404,135 | B1 * | 8/2022 | Parker | G06F 11/108 |
| 11,467,736 | B1 * | 10/2022 | Nipunage | G06F 9/321 |

(Continued)

OTHER PUBLICATIONS

International Search Report for PCT/US2024/018132 dated Jun. 5, 2024; 2 pages.

(Continued)

*Primary Examiner* — Jonathan D Gibson

(57) ABSTRACT

Systems, methods, and devices prevent data loss in memory devices. Systems may include a non-volatile memory device that includes a first data unit configured to store data for the non-volatile memory device and associated metadata, and a second data unit configured to store data for the non-volatile memory device and associated metadata, wherein the first data unit and second data unit are configured to alternate storing a most recent version of the data and associated metadata. The systems may also include control circuitry configured to read metadata from the first data unit and the second data unit, identify the first data unit as an inactive data unit based on contents of the first data unit and the second data unit, and perform one or more update operations such that the first data unit is updated and set as an active unit when the update operations are complete.

20 Claims, 15 Drawing Sheets

(56) References Cited

U.S. PATENT DOCUMENTS

| | | | |
|---|---|---|---|
| 2004/0078681 A1* | 4/2004 | Ramirez | G06F 11/0778 |
| | | | 714/37 |
| 2011/0126046 A1* | 5/2011 | Hoang | G06F 11/2015 |
| | | | 713/340 |
| 2018/0157428 A1* | 6/2018 | Li | G06F 11/108 |
| 2019/0310918 A1* | 10/2019 | Frolikov | G06F 1/3225 |
| 2022/0091760 A1* | 3/2022 | Lee | G06F 3/064 |
| 2023/0123923 A1* | 4/2023 | Patil | G06F 16/27 |
| | | | 711/162 |
| 2024/0330113 A1* | 10/2024 | Frolikov | G06F 11/1446 |

OTHER PUBLICATIONS

Written Opinion of the International Searching Authority for PCT/US2024/018132 dated Jun. 5, 2024; 7 pages.

\* cited by examiner

DATA LOSS PROTECTION FOR MEMORY SYSTEMS AND DEVICES

CROSS-REFERENCE TO RELATED APPLICATIONS

This application claims the benefit under 35 U.S.C. § 119(e) of U.S. Provisional Patent Application No. 63/449,644, filed on Mar. 3, 2023, which is incorporated herein by reference in its entirety for all purposes.

TECHNICAL FIELD

This disclosure generally relates to memory devices, and more specifically, to prevention of data loss in such memory devices.

BACKGROUND

Memory devices may include various memory cells that are configured to store data values in accordance with a memory architecture. For example, such data values may be stored by being written or programmed using, in one example, various word lines and bit lines. Special data, such as configuration data included in a configuration registry, may be stored in such memory devices, and may be used during various memory device operations, such as the device being powered up. Accordingly, such configuration data may undergo read operations when such data is read by the memory device, as well as write/program operations when updated data is received. Traditional memory devices remain limited in their ability to store and maintain such special data in a manner that is immune to unexpected system events, such as power loss events.

DETAILED DESCRIPTION

Figure 1:
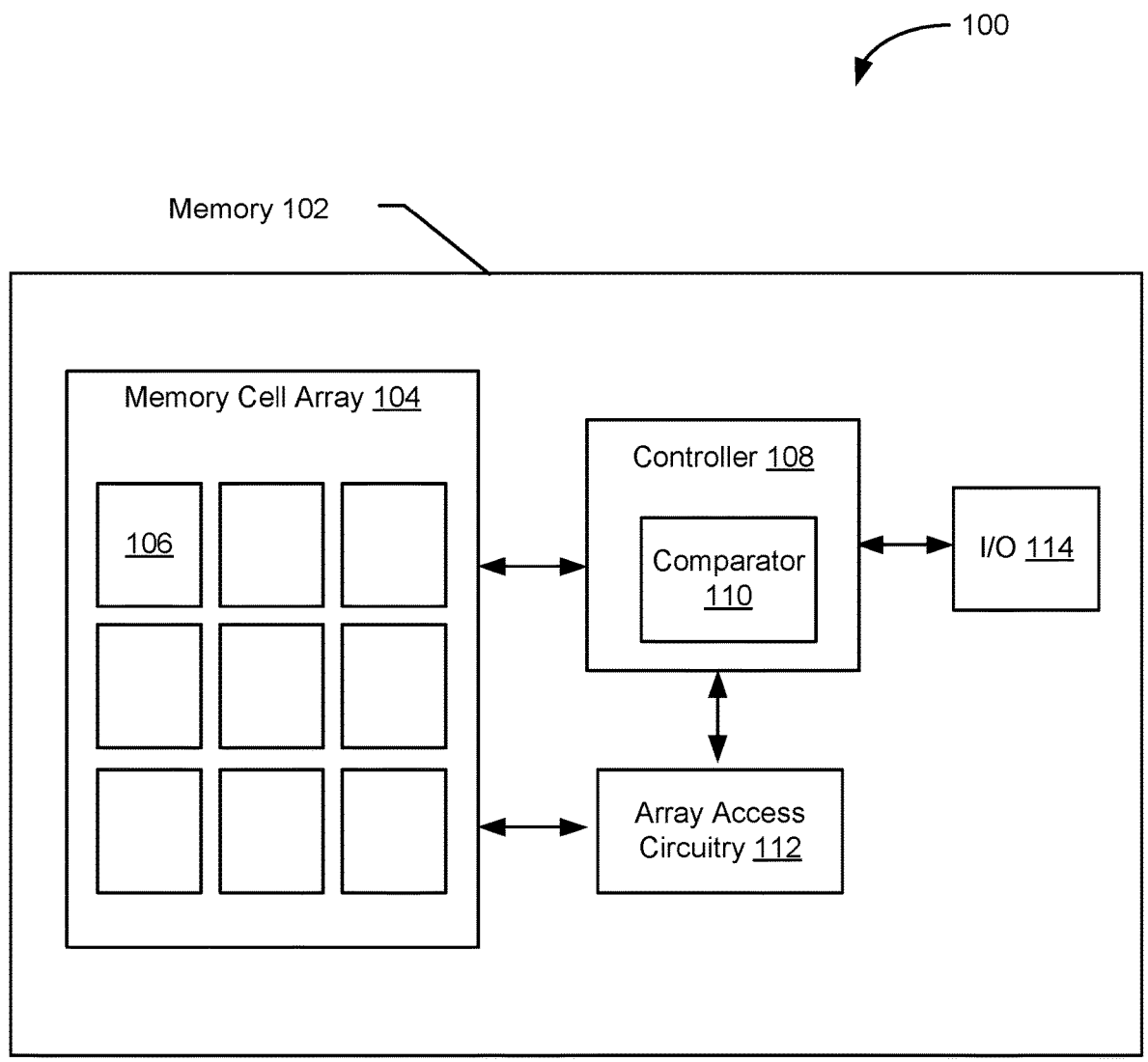
FIG. 1 illustrates an example of a memory device, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Memory devices may include portions configured to store special data used for system purposes. For example, a particular portion of a memory device may be configured to store special data such as a configuration registry. Such data may be used by the memory device when powering up, as well as for various other system operations. Moreover, such data may be periodically updated based on update data received at a memory device. For example the memory device may receive a data object, also referred to herein as update data, that may include a data payload that includes an update to such configuration registry data. As will be discussed in greater detail below, in secure contexts, such data may also include a security certificate data structure used for validation purposes, as well as a firmware data structure which may be used to manage firmware.

Accordingly, one or more memory operations may be performed to implement such update operations and ensure that updates included in the received update are implemented in the stored special data. However, one or more events may occur, sometimes unexpectedly, during such an update operation. For example, the memory device may experience power loss during such update operations. In such an example, it is possible that the special data becomes corrupted and unusable by the memory device, as may be the case with a corrupted configuration registry. Conventional techniques remain limited in addressing such power loss events because they often require additional dedicated hardware, such as a one time programming (OTP) array, that cannot handle a high volume of requests. Accordingly, conventional techniques are not able to provide data loss immunity in an efficient and effective manner.

Embodiments disclosed herein provide at least two data units used to store special data and associated metadata where one data unit is designated as an active unit, and the other data unit is designated as an inactive unit. As will be discussed in greater detail below, update operations and reset or erase operations may be managed such that a previous data is maintained through an update process and only deactivated once the update is complete. The active and inactive data units may toggle back and forth as update operations increment. In this way, a previous version of the special data may be maintained in the event of a power loss event or other disruptive event during an update operation. As will also be discussed in greater detail below, one or more read operations may be performed to read data from the data units as well as generate one or more messages identifying a status of the data units and whether or not one or more errors has been detected. Accordingly, embodiments provide data loss immunity that may or may not require additional hardware, such an additional memory array, and do so in a manner that provides specific messages about any errors that may occur.

FIG. 1 illustrates an example of a memory device, configured in accordance with some embodiments. Accordingly, a memory device, such as device 100, may include memory cells stored in a memory cell array 104. As will be discussed in greater detail below, device 100 may be configured to manage the usage of active and inactive data units in a manner that provides protection from data loss that may otherwise occur due to one or more system events, such as a power loss event. More specifically, device 100 may alternate between active and inactive data units used to store sensitive and special data, such as a configuration registry or credential data. Such usage of active and inactive data units may ensure that a previous version of the data is available in the event of power loss during updating with new data.

In various embodiments, device 100 includes components that may be implemented as one or multiple integrated circuits. More specifically, device 100 may include a memory module, such as memory 102. In various embodiments, memory 102 includes an input/output interface, such as I/O 114, which may be configured to facilitate communications with one or more other components of a memory system. Memory 102 further includes controller 108 which is configured to perform various memory operations for device 100. As will be discussed in greater detail below, such operations may include read, write, program, and/or erase operations as may be determined based on a type of memory included in device 100. Accordingly, controller 108 may include one or more processing elements configured to perform such operations. Such processing elements may be included in processors and/or control circuitry implemented in any suitable manner. In some embodiments, controller 108 additionally includes comparator 110 which is configured to perform one or more comparison operations that may be included in the verification of one or more memory operations, such as the verification of a completion of a memory operation. In one example, comparator 110 may be configured to compare the erase power loss indicator (EPLI) code words programmed in memory sectors during erase operations with designated EPLI codes to verify the completion of the erase operations. Such designated EPLI codes may be generated or stored within controller 108. Memory 102 may also include array access circuitry 112 configured to provide controller 108 with additional access to components of memory 102.

In various embodiments, memory 102 also includes memory cell array 104 which is configured to include rows and columns of memory cells. Depending on the configuration of memory 102, memory cell array 104 may have various sectors, such as sector 106, that may each have associated EPLI bits. In one example, memory cell array 104 may be configured as flash memory device, such as a NOR flash memory. In this example, memory cell array 104 may include multiple erase sectors. In another example, memory cell array 104 is a resistive random access memory (RRAM) device, and does not have block or sector constraints. While embodiments disclosed herein describe RRAM devices, it will be appreciated that any suitable type of nonvolatile memory may be used. For example, any suitable single bit switching modality may be used herein. As will be discussed in greater detail below, special data included in memory cell array 104 may be stored and updated using associated active and inactive data units in a manner that provides immunity from power loss events.

Figure 2:
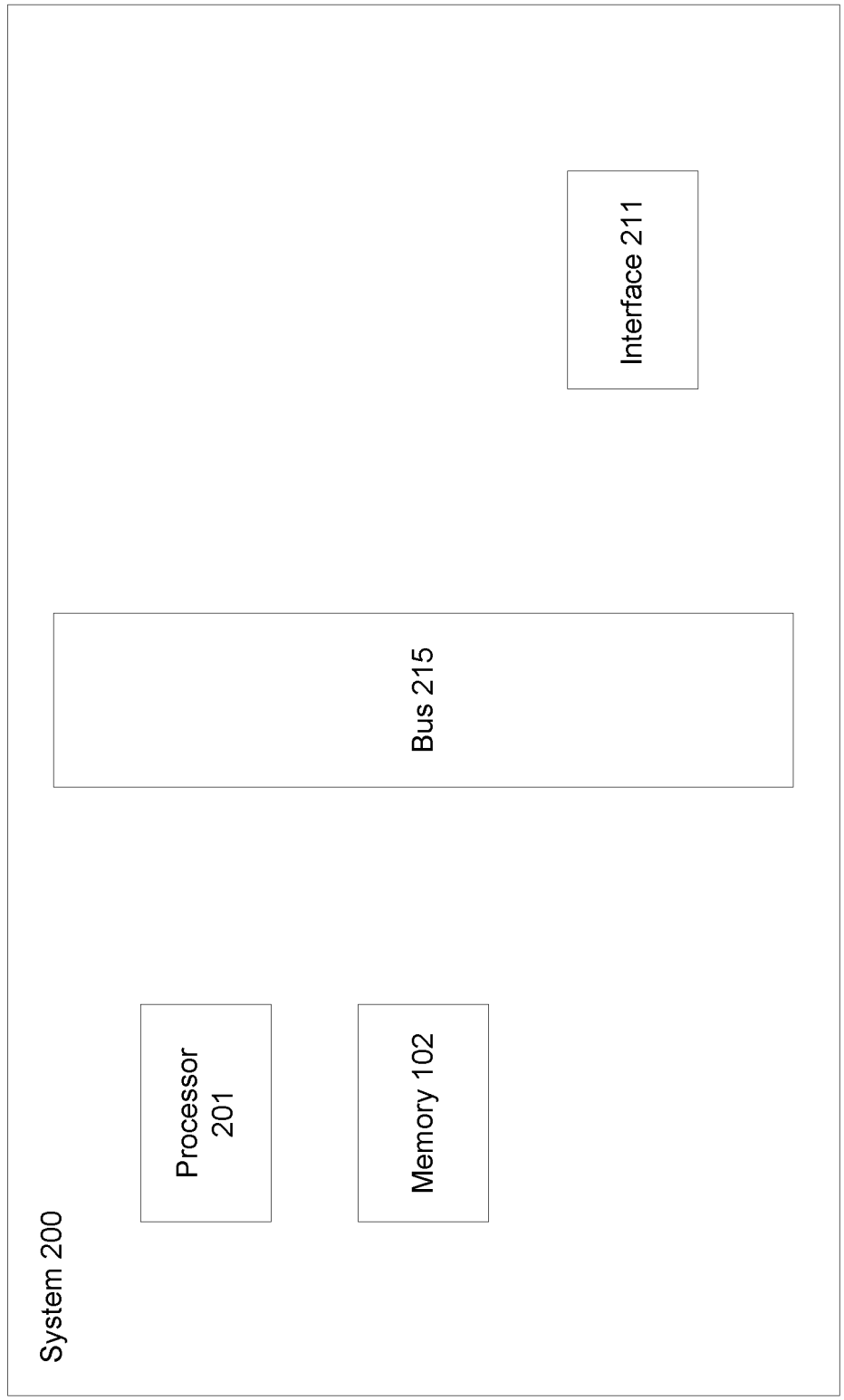
FIG. 2 illustrates an example of a memory system that may include a memory device, configured in accordance with some embodiments.

FIG. 2 illustrates an example of a memory system that may include a memory device, configured in accordance with some embodiments. According to particular example embodiments, system 200 may be suitable for implementing various components described above, such as device 100 as well as the active and inactive data units described above and in further detail below. In various embodiments, system 200 may include processor 201 which may be configured to implement one or more processing operations. For example, processor 201 may be configured to implement read and write operations as well as program and erase operations associated with memory 102. System 200 may also include bus 215 which may be configured to enable communication between various components of system 200.

In various embodiments, system 200 may further include memory 102, which may include a controller, as discussed above. Accordingly, memory 102 may be configured to implement the active and inactive data units discussed above and in greater detail below. In various embodiments, processor 201 may be configured to implement one or more memory operations. In this way, system 200 may have a dedicated processing unit, such as processor 201, which may be configured to implement memory operations as disclosed herein. It will be appreciated that one or more components of processor 201 or a controller included in memory 102 may be implemented in an application specific integrated circuit (ASIC), or may be implemented in reprogrammable logic of a field programmable gate array. In some embodiments, processor 201 may be implemented in a programmable system or controller that further includes a nonvolatile memory device, such as a Programmable System On a Chip or PSoC™ controller, commercially available from Cypress Semiconductor of San Jose, California and Infineon Technologies of Neubiberg, Germany. In various embodiments, one or more components of system 200 may be implemented on the same circuit die and in the same package. For example, processor 201 and memory 102 may be implemented on the same circuit die. In some embodiments, they may be implemented on different dies and in different packages.

In various embodiments, communications interface 211 may be configured to send and receive data to other system components, or may be configured to send and receive packets or data segments over a network. For example, communications interface 211 may be communicatively coupled to a user interface device via a bus, such as bus 215, or via a communications network. As discussed above, communications interface 211 may be configured to receive data from such a user interface device which may be included in a data processing system or computer system. In various embodiments, communications interface 211 may be a serial peripheral interface (SPI). In some embodiments, communications interface 211 may also include a data interface, such as one of Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Figure 3:
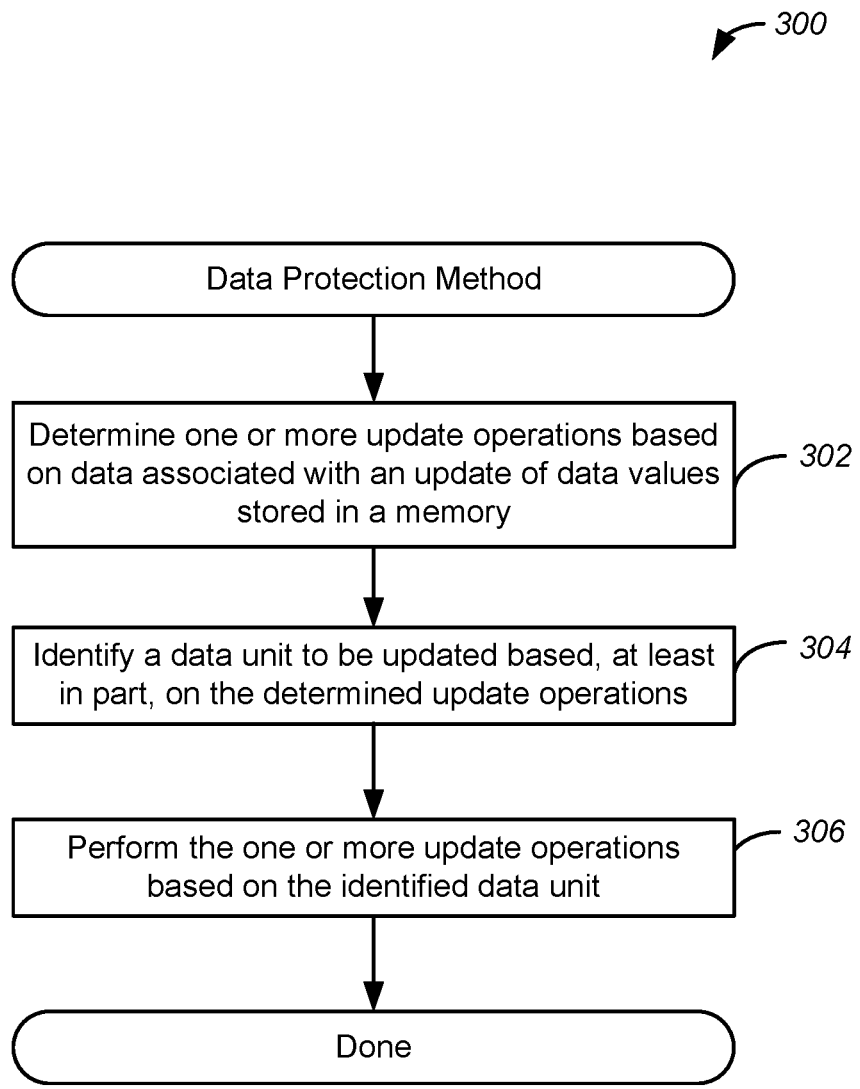
FIG. 3 illustrates a flow chart of an example of a method for data protection, performed in accordance with some embodiments.

FIG. 3 illustrates a flow chart of an example of a method for data protection, performed in accordance with some embodiments. Accordingly, a method, such as method 300, may be performed to determine which update operations are appropriate for a memory device, and to perform such update operations. More specifically, active and inactive data units may be managed based on a status of such data units as well as features of the data being updated. In this way, such usage of active and inactive data units may ensure that a previous version of the data is available in the event of power loss during updating with new data. As will be discussed in greater detail below, such data units may be implemented in a variety of memory context, such as secure flash memories using sector-based architectures.

Method 300 may perform operation 302 during which one or more update operations may be determined based on data associated with an update of data values stored in a memory. In various embodiments, such update operations may be determined based on one or more update parameters, such as whether or not new data is included in an update and/or if an error message has been detected. Accordingly, update parameters may be one or more data values identifying conditions that trigger update operations. Such update parameters may include data values such as version data as well as valid code status indicators. As will be discussed in greater detail below, specific update operations may be dynamically determined based on such update parameters for each update, thus reducing unnecessary duplicative update operations.

Method 300 may perform operation 304 during which a data unit to be updated may be identified based, at least in part, on the determined update operations. Accordingly, the data unit to be updated may be identified based on the update parameters discussed above, as well as one or more active/inactive identifiers. As will be discussed in greater detail below, active and inactive data units may be identified by one or more flags or identifiers. For example, an active unit may be identified based on a designated valid code. Accordingly, during operation 304, data fields of the data units may be used to identify an inactive identifier, and its associated inactive data unit.

Method 300 may perform operation 306 during which the one or more update operations may be performed based on the identified data unit. In some embodiments, the one or more update operations may be performed for an inactive data unit, and the inactive data unit may be set as the active data unit once the update is complete. Moreover, the previously identified active unit may be set as the inactive data unit. Accordingly, the update may be performed using the inactive data unit while a previous version of the data is retained and remains available in the active unit in case of a system event such as power loss.

Figure 4:
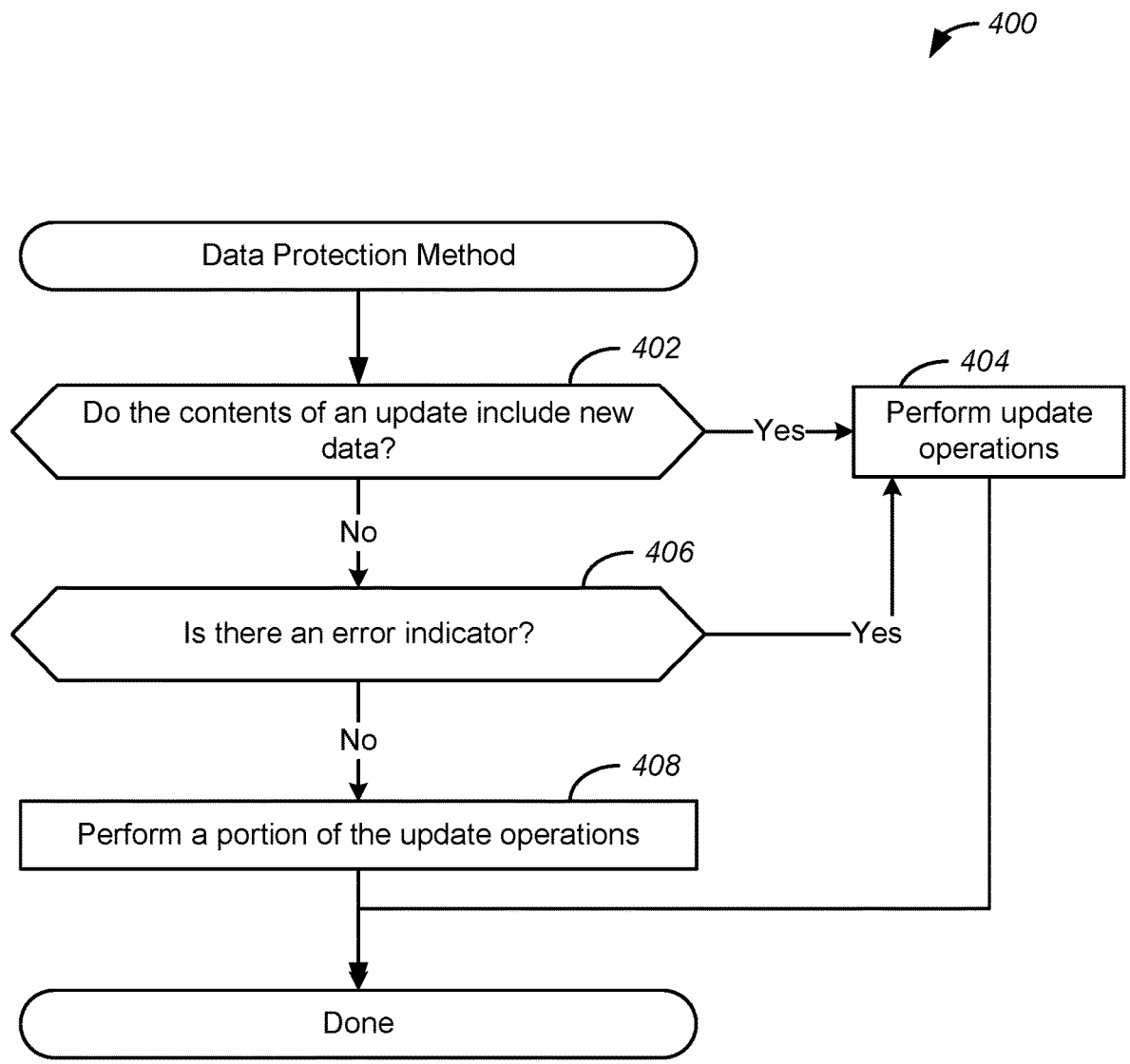
FIG. 4 illustrates a flow chart of another example of a method for data protection, performed in accordance with some embodiments.

FIG. 4 illustrates a flow chart of another example of a method for data protection, performed in accordance with some embodiments. Accordingly, a method, such as method 400, may be performed to determine which update operations are appropriate for a memory device, and to perform such update operations. As will be discussed in greater detail below, active and inactive data units may be managed based on a status of such data units as well as features of the data being updated. In this way, such usage of active and inactive data units may ensure that a previous version of the data is available in the event of power loss during updating with new data.

Method 400 may perform operation 402 during which it may be determined if the contents of an update include new data. In various embodiments, a data file or object may be received at a memory module, and the data object may include an update to be applied to special data of the memory module. As similarly discussed above, special data may refer to configuration data, such as a configuration registry, or other system data. As disclosed herein, special data may refer to any data that undergoes update operations and has also been identified as being subject to power loss immunity. Accordingly, such data may be system or device data used to manage operation of the device in accordance with one or more specifications and/or standards, and such data may be transparent to a user. Accordingly, depending on the type of memory, the update may include such special data and/or other data objects such as a firmware update and a certificate used for secure memory. During operation 402, the data included in the received data object may be compared against existing data stored in memory to determine if the data is the same, or if the received data object includes new data.

If it is determined that the data object includes new data, method 400 may proceed to operation 404 during which update operations may be performed to update the special data with the new data included in the update. As will be discussed in greater detail below, such update operations may include the management of data stored in an inactive data unit and an active data unit to complete the update while providing protection from a system event, such as power loss. More specifically, an inactive data unit may be updated and set as the active unit while previous data stored in the previously active unit is retained for redundancy purposes, and then set as the inactive data unit.

Returning to operation 402, if it is determined that there is no new data, method 400 may proceed to operation 406 during which it may be determined if there an error indicator. Such a determination may be made based on a status indicator associated with an active data unit. Accordingly, the status indicator may be checked to determine if it identifies an error, as may occur during a power loss event. In some embodiments, such status indicators may trigger the generation of an error message or a separate flag or indicator. Thus, during operation 406, such additional messages may also be queried. If it is determined that there is an error message, method 400 may proceed to operation 404 where update operations are performed to ensure valid data has been entered, and the error indicator has been addressed.

If it is determined that there is no error message, then method 400 may proceed to operation 408 during which a portion of the update operations. Accordingly, since no new data is included in the update, and there is no error message, a portion of the update operations may be performed to avoid repetition of unnecessary write/program operations, and to extend the operational life of the memory device. For example, the portion of the update operations may include refreshing a valid status indicator while not rewriting all the data included in the update. Additionally, command performance may be improved as well because avoiding repetition of unnecessary write/program operations increases available resources and throughput associated with processing commands.

Figure 5:
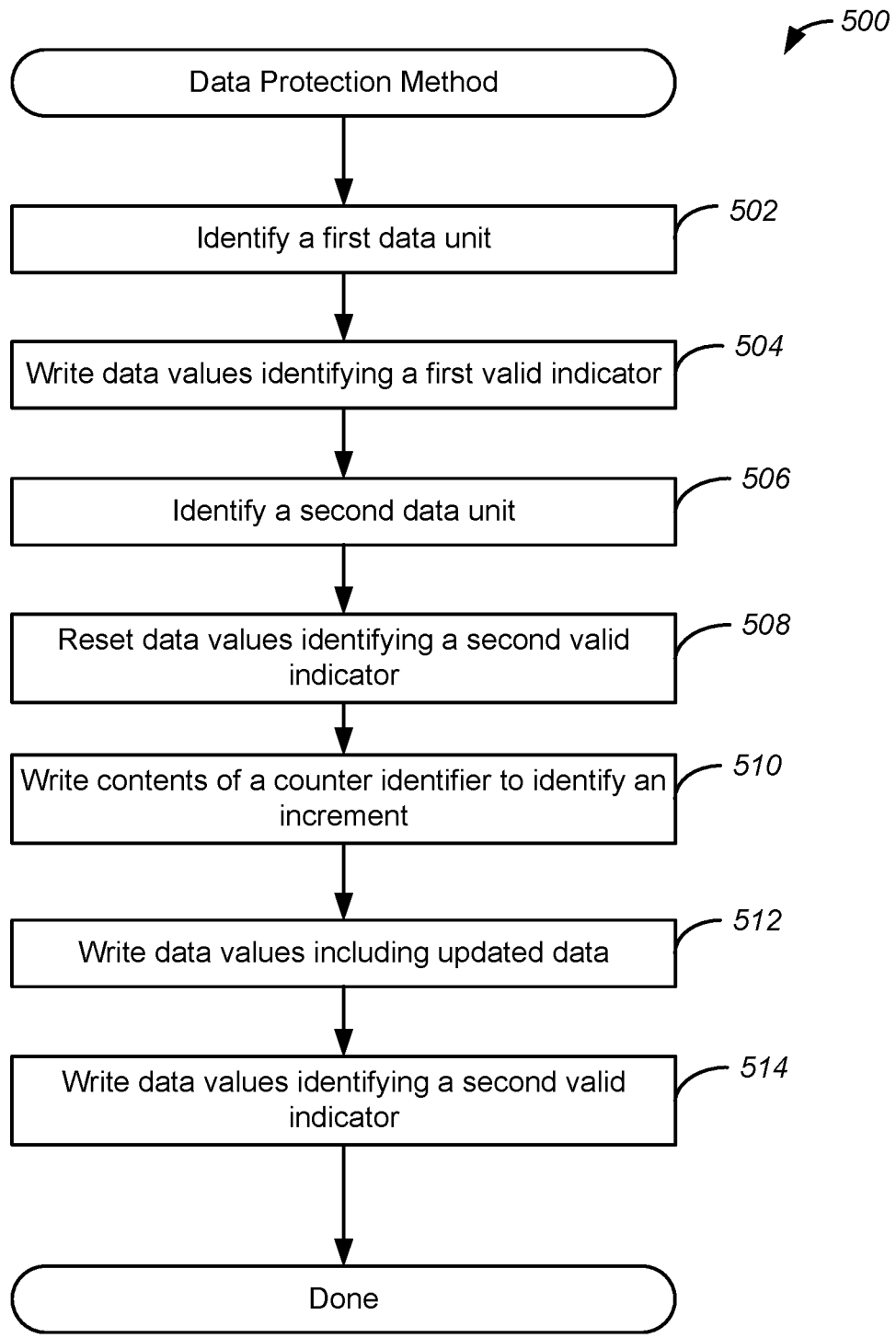
FIG. 5 illustrates a flow chart of yet another example of a method for data protection, performed in accordance with some embodiments.

FIG. 5 illustrates a flow chart of yet another example of a method for data protection, performed in accordance with some embodiments. As will be discussed in greater detail below, a method, such as method 500, may be performed to implement update operations for a memory device. More specifically, active and inactive data units may be managed based on a status of such data units as well as features of the data being updated. In this way, such usage of active and inactive data units may ensure that a previous version of the data is available in the event of power loss during updating with new data.

Method 500 may perform operation 502 during which a first data unit may be identified. As similarly discussed above, the first data unit may be a currently active data unit included in a configuration register configured to store data, such as registry data or other special data. The first data unit may be identified as active based on a stored index value, such as a valid code status, as well as additional metadata that may include status information, as will be discussed in greater detail below. In one example, a counter included in a component, such as a controller, may increment counts based on update operations. Data units may be storage locations included in the configuration register that may each include multiple data fields, and may be identified as active or inactive based on a counter index and other metadata. In some embodiments, each data unit may include a count index field, a valid indicator field, and a data field configured to store data. Accordingly, one or more pairs of data units may be included in the configuration register having even and odd counter indices. During operation 502, in response to determining an update is to be performed, a currently active data unit may be identified based on the current value of the counter and/or a highest count index as well as one or more other data fields to determine a valid code status that identifies the active data unit.

Method 500 may perform operation 504 during which data values identifying a first valid indicator may be written. Accordingly, the active data unit may be identified and the valid indicator of the active data unit may be refreshed by, for example, rewriting the valid indicator. In this way, validity of at least one of the versions of data may be ensured.

Method 500 may perform operation 506 during which a second data unit may be identified as inactive. In various embodiments, the second data unit may be a currently inactive data unit. The inactive data unit may currently have a lower count index and may have been used for a previous update operation. Accordingly, the inactive data unit may be identified based on the lower count index and other data fields used to determine a valid code status, or based on its associated pairing with the active data unit.

Method 500 may perform operation 508 during which data values identifying a second valid indicator may be reset. Accordingly, the valid indicator field of the inactive data unit may be overwritten with one or more data values identifying a reset. As will be discussed in greater detail below, the valid indicator may be set to this state for the duration of the update operation to indicate that an update is being performed.

Method 500 may perform operation 510 during which contents of a counter identifier may be written to identify an increment. Accordingly, the contents of the count index field may be overwritten with a new count index that represents an increment to the current count value. For example, if a current count is "n", the count index may be written to a value of "n+1".

Method 500 may perform operation 512 during which data values including updated data may be written. Accordingly, the data field may be updated to include new data included in an update. In this way, the new data included in an update may be stored in the inactive data unit while the previous version is maintained in the active data unit. Accordingly, if a power loss event occurs during method 500, the previous version of the data remains available so that it may be used in case the new data is corrupted and rendered unusable by the power loss event.

Method 500 may perform operation 514 during which data values identifying a second valid indicator may be written. Thus, as similarly discussed above, the valid indicator may be changed from the reset code back to a valid code thus indicating the that the update is complete, and the contents of the data unit are valid. Because the counter has been incremented, the inactive data unit is now set as the active data unit, and the active data unit identified during operation 502 is now set as the inactive data unit. Additional iterations of method 500 may be performed for subsequent update operations. In this way, the data units may toggle back and forth between inactive and active to provide redundancy for data stored in the configuration register.

Figure 6:
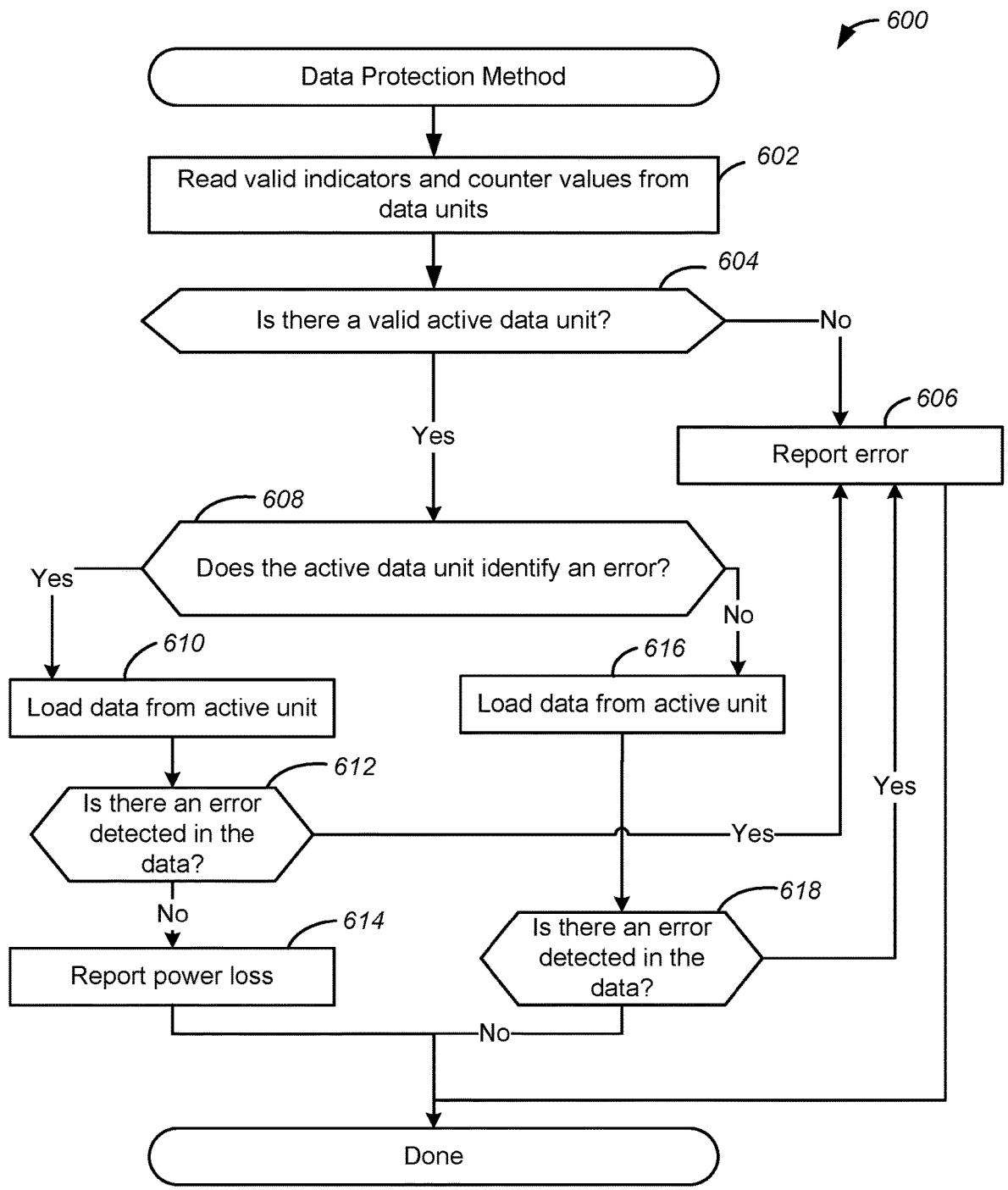
FIG. 6 illustrates a flow chart of an additional example of a method for data protection, performed in accordance with some embodiments.

FIG. 6 illustrates a flow chart of an additional example of a method for data protection, performed in accordance with some embodiments. As will be discussed in greater detail below, a method, such as method 600, may be performed to read data values from an active data unit. Moreover, as will be discussed in greater detail below, method 600 may also be performed to identify one or more error states. Accordingly, data read from the data units may be used to determine if there is a memory error and if a power loss event has occurred.

Method 600 may perform operation 602 during which valid indicators and counter values may be read from data units. As similarly discussed above, one or more data units may be used to store special data and associated metadata, and such data units may be toggled between active and inactive statuses to provide redundancy in storage and update operations. During operation 602, a valid indicator and count value may be retrieved from each data unit.

Method 600 may perform operation 604 during which it may be determined if there is a valid active data unit. As similarly discussed above, the count values may be used to identify an active data unit. Moreover, a system component, such as a controller, may also retrieve a current count value from a counter that may also be used for verification purposes. As will be discussed in greater detail below with reference to Table 1, the data unit having a higher count value may be identified as the active unit, and a status of its valid indicator may be used to assess its validity. More specifically, if both valid indicator codes do not store an acceptable valid code and/or if both valid indicator codes do store an acceptable valid code but their counters differ by a value other than 1, then it may be determined that no active unit may be reliably identified, and method 600 may proceed to operation 606 where an error message is generated indicating no active data unit has been found, and a memory error has occurred. If both valid indicator codes do store an acceptable valid code and their counters differ by a value of 1 and/or if only one of the valid indicators is valid, then method 600 may proceed to operation 608.

Accordingly, during operation 608, it may be determined if the active data unit identifies an error. Accordingly, once an active data unit has been identified, method 600 may then determine if the data unit itself includes any errors. As will be discussed in greater detail below with reference to Table 1, a look up table may be used to determine whether or not an error is present based, at least in part, on the retrieved valid indicators and count values.

If it is determined that the data unit includes an error, method 600 may perform operation 610 during which the data may be loaded from the active data unit. Method 600 may proceed to operation 612 where it may be determined if an error is detected in the data. If it is determined that there is an error in the data, method 600 may proceed to operation 606 where an error message is generated. If it is determined that there is no error in the data, method 600 may proceed to operation 614 where a message is generated identifying a power loss event.

Returning to operation 608, if it is determined that the data unit does not include an error, method 600 may perform operation 616 during which the data may be loaded from the active data unit. Method 600 may proceed to operation 618 where it may be determined if an error is detected in the data. If it is determined that there is an error in the data, method 600 may proceed to operation 606 where an error message is generated. If it is determined that there is no error in the data, method 600 may terminate after successfully loading data from the active data unit.

TABLE 1

| First Valid Indicator | Second Valid Indicator | First Count Value | Second Count Value | Interpretation |
|---|---|---|---|---|
| Valid | Valid | n | n-1 | First data unit; no error |
| Valid | Not valid | n | Other | First data unit; error |
| Valid | Valid | n-1 | n | Second data unit; no error |
| Not valid | Valid | Other | n | Second data unit; error |
| Any other combination | | | | Non-recoverable error |

As shown above, Table 1 illustrates a mapping of valid indicators and count values to one or more output determinations made by, for example, a controller, as similarly discussed above. The determinations, also noted above as interpretations, may be used as valid code statuses discussed above. A value noted as "other" may be any set of data values as in such instances, those data fields are not determinative of the status. Accordingly, such a look up table may be used to map retrieved valid indicator values and count values to a determination of an active data unit and whether or not an error occurred.

Figure 7:
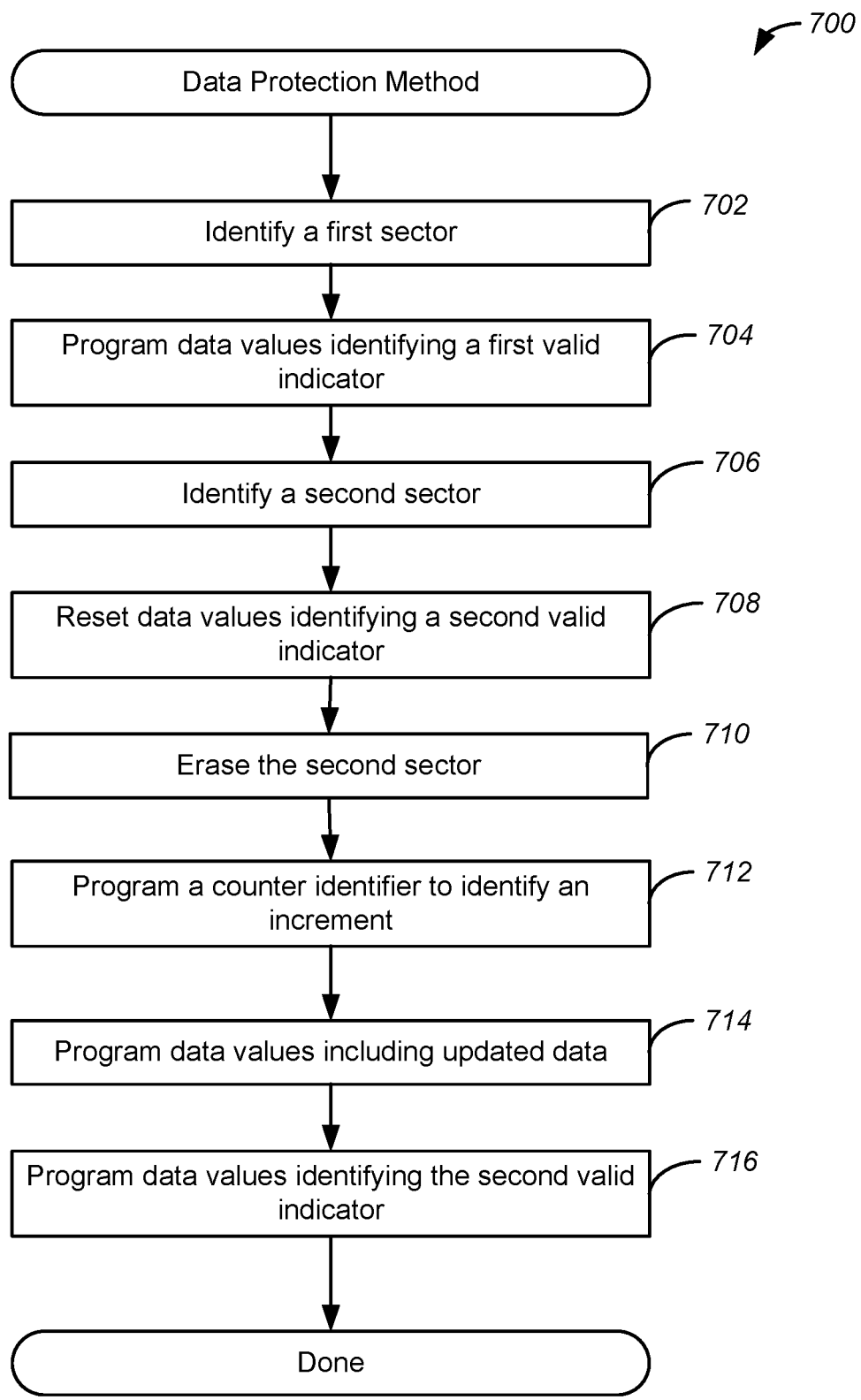
FIG. 7 illustrates a flow chart of yet another example of a method for data protection, performed in accordance with some embodiments.

FIG. 7 illustrates a flow chart of yet another example of a method for data protection, performed in accordance with some embodiments. As will be discussed in greater detail below, a method, such as method 700, may be performed to implement update operations for a memory device. More specifically, the memory device may be a flash memory device in which data and memory operations, such as erase operations, are managed using erase sectors. Accordingly, as will be discussed in greater detail below, active and inactive data units may be managed in a manner that ensures that a previous version of data is available in the event of power loss while comporting to an erase sector-based operations determined based on a flash architecture. For example, data units may be implemented on an erase sector basis such that different data units and associated data structures have different independently programmable and erasable erase sectors. In one example, each erase sector may have 16 wordlines where a first wordline is reserved for metadata, and the remaining wordlines are used for special data.

Method 700 may perform operation 702 during which a first erase sector may be identified as active. As similarly discussed above, the first erase sector may be a currently active erase sector configured to store data. In various embodiments, a particular erase sector may have several wordlines, such as 16 wordlines. Additional details regarding such wordlines are discussed in greater detail below with reference to FIG. 10A.

Accordingly, during operation 702, the first erase sector may be identified based on a valid code status, as similarly discussed above. In one example, a counter included in a component, such as a controller, may increment counts based on update operations. As similarly discussed above, each erase sector may include a count index field and a data field configured to store data. The erase sectors may also include a version data field as well as a security data field. In various embodiments, one or more pairs of erase sectors may be included in the configuration register having even and odd counter indices. During operation 702, in response to determining an update is to be performed, a currently active erase sector may be identified based on one or more data fields, such as the current value of the counter and/or a highest count index, that may be used to determine a valid code status.

Method 700 may perform operation 704 during which data values identifying a first valid indicator may be programmed. Accordingly, the active erase sector may be identified and a first valid indicator of the active erase sector may be refreshed by, for example, reprograming the valid indicator. In various embodiments, the valid indicator is a designated flag or sequence of bits configured to be recognized by a system component, such as a controller, as an indicator of valid data following successful completion of a program or erase operation. In some embodiments, the valid indicator may include bits, such as error power loss indicator bits.

Method 700 may perform operation 706 during which a second erase sector may be identified. In various embodiments, the second erase sector may be a currently inactive erase sector. The second erase sector may currently have a lower count index and may have been used for a previous update operation. Moreover, the second erase sector may be included in a different erase sector than the first erase sector. Accordingly, the second erase sector may be identified based on the lower count index, or based on its associated pairing with the first erase sector.

Method 700 may perform operation 708 during which data values identifying a second valid indicator may be reset. Accordingly, the valid indicator field of the second erase sector may be overwritten with one or more data values, such as all zeros. In various embodiments, such overwriting of data may be the onset of an update process where any previously stored data is devalidated and destroyed by overwriting the data with a designated value, such as all zeros.

Method 700 may perform operation 710 during which the second erase sector may be erased. Accordingly, an erase operation may be performed for the second erase sector, and the second erase sector may be made ready for reprogramming with updated data. Moreover, one or more data fields, such as the count index field and the valid indicator field may store data values representing a reset operation. For example, such fields may be erased with the data values "FF". As will be discussed in greater detail below, such indicators may be set to this state for the duration of the update operation, and until overwritten, to indicate that an update is being performed.

Method 700 may perform operation 712 during which a counter identifier may be programmed to identify an increment. Accordingly, the contents of the count index field may be written to include a new count index that represents an increment to the current count value. For example, if a current count is "n", the count index may be written to a value of "n+1".

Method 700 may perform operation 714 during which data values including updated data may be programmed. Accordingly, the data field may be updated to include new data included in an update. Moreover, the version data may also be updated. In this way, the new data included in an update may be stored in the second erase sector while the previous version is maintained in the first erase sector.

Method 700 may perform operation 716 during which data values identifying the second valid indicator may be programmed. Thus, as similarly discussed above, the valid indicator may be changed from the reset code back to a valid code thus indicating that the update is complete, and the contents of the second erase sector are valid. Because the counter has been incremented, the second and inactive erase sector is now set as the active erase sector, and the first and previously active erase sector identified during operation 702 is now set as the inactive erase sector. Additional iterations of method 700 may be performed for subsequent update operations. In this way, the erase sectors may toggle back and forth between inactive and active to provide redundancy for data stored in the secure memory.

Figure 8:
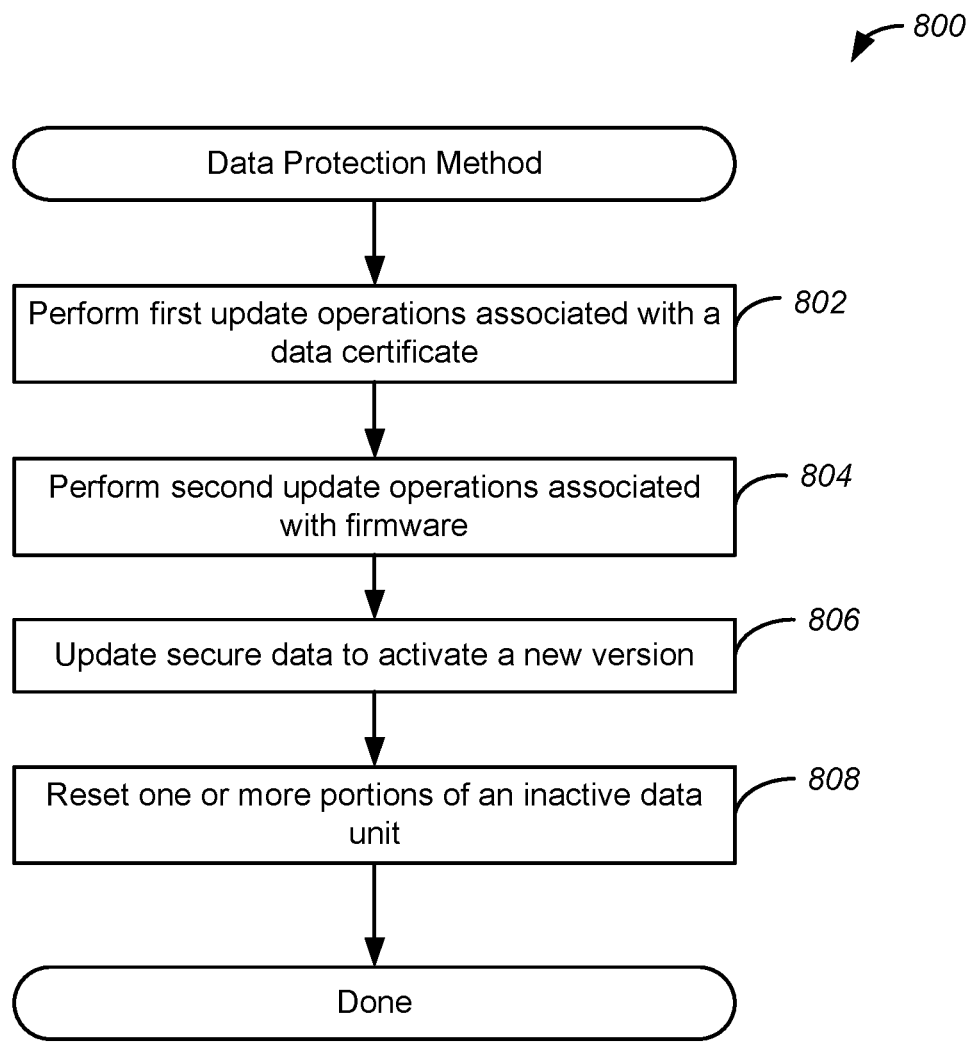
FIG. 8 illustrates a flow chart of another example of a method for data protection, performed in accordance with some embodiments.

FIG. 8 illustrates a flow chart of another example of a method for data protection, performed in accordance with some embodiments. As will be discussed in greater detail below, a method, such as method 800, may be performed to implement update operations for a memory device that may be a secure memory device. Accordingly, data stored in the memory device may include security data, such as a certificate data structure. Moreover, the security data may also include a firmware data structure. Accordingly, data may include the previously described special data and its associated metadata as well as certificate data and firmware data. In one example, during a firmware version update, both firmware and certificate data structures may be updated. Thus, different iterations of update procedures, such as those discussed in greater detail below with reference to FIG. 9, may be performed for each data structure type during a firmware version update. As will be discussed in greater detail below, active and inactive data units may be managed to ensure that previous versions of the special data may be available in the event of power loss, and in a manner compliant with security standards.

In various embodiments, secure systems and devices are configured to store data securely, and may store data in accordance with one or more security constraints. For example, a latest version of data may be kept, and older versions may be erased. Accordingly, there may be one valid sector. A previous version may be kept during an update process to be available in case of a power loss event. At the end of an update process, the previous version may be deleted.

Moreover, secure systems and devices may include a command counter that may be used to provide count metadata instead of a dedicated incremental counter. Accordingly, a count value may be obtained from the command counter during an update operation, and might not be an incremental count value. Furthermore, since special data of secure systems and devices is hashed for security purposes, a hash code may be used for the valid code. As will be discussed in greater detail below, various data types may be included in such secure systems and devices, such as certificates and firmware that may each have associated update operations.

Method 800 may perform operation 802 during which first update operations associated with a data certificate may be performed. As will be discussed in greater detail below, the first update operations may be determined based on update data associated with the data certificate. More specifically, during operation 802, first update operations may be determined and implemented for a certificate data structure. As will be discussed in greater detail below, the first update operations may be determined in response to a firmware version being updated, and for a first data structure type, such as a certificate data structure. In various embodiments, the version data may be stored in a metadata column. Accordingly, as will be discussed in greater detail below at least with reference to FIG. 11, in a secure flash context, additional metadata columns may be used to store data such as version data.

Method 800 may perform operation 804 during which second update operations associated with firmware may be performed. As will be discussed in greater detail below, the second update operations may be determined based on update data associated with the firmware. More specifically, during operation 804, second update operations may be determined and implemented for a firmware data structure. As will be discussed in greater detail below, the second update operations may be determined in response to the firmware version being updated, and for a second data structure type, such as a firmware data structure.

Method 800 may perform operation 806 during which secure data may be updated to activate a new version. Accordingly, new data included in an update may be used to update the secure data, and if included, a new certificate and a new firmware data structure may be activated. As similarly discussed above and as will be discussed in greater detail below, the activation of the updated data structures may be performed by updating a count value. More specifically, a secure storage location, which may be a separate storage area than that used for the special data, may be updated to identify the updated version. For example, a version number in the secure storage location may be updated. In this example, the version number stored in the secure storage location will match the version number stored in version data field associated with the certificate and firmware data structures. When these versions match, the secure data is determined to be activated, and may be used for subsequent memory operations. Once the stored version data matches, method 800 may proceed to operation 808.

Accordingly, during operation 808 one or more portions of an inactive data unit may be reset. In some embodiments, the portions of the now inactive data unit used to store the certificate and firmware may be reset by, for example, writing a reset code or value, such as "FF". Such resetting and overwriting of previous security data may be performed for compliance with one or more security standards associated with secure data storage.

Figure 9:
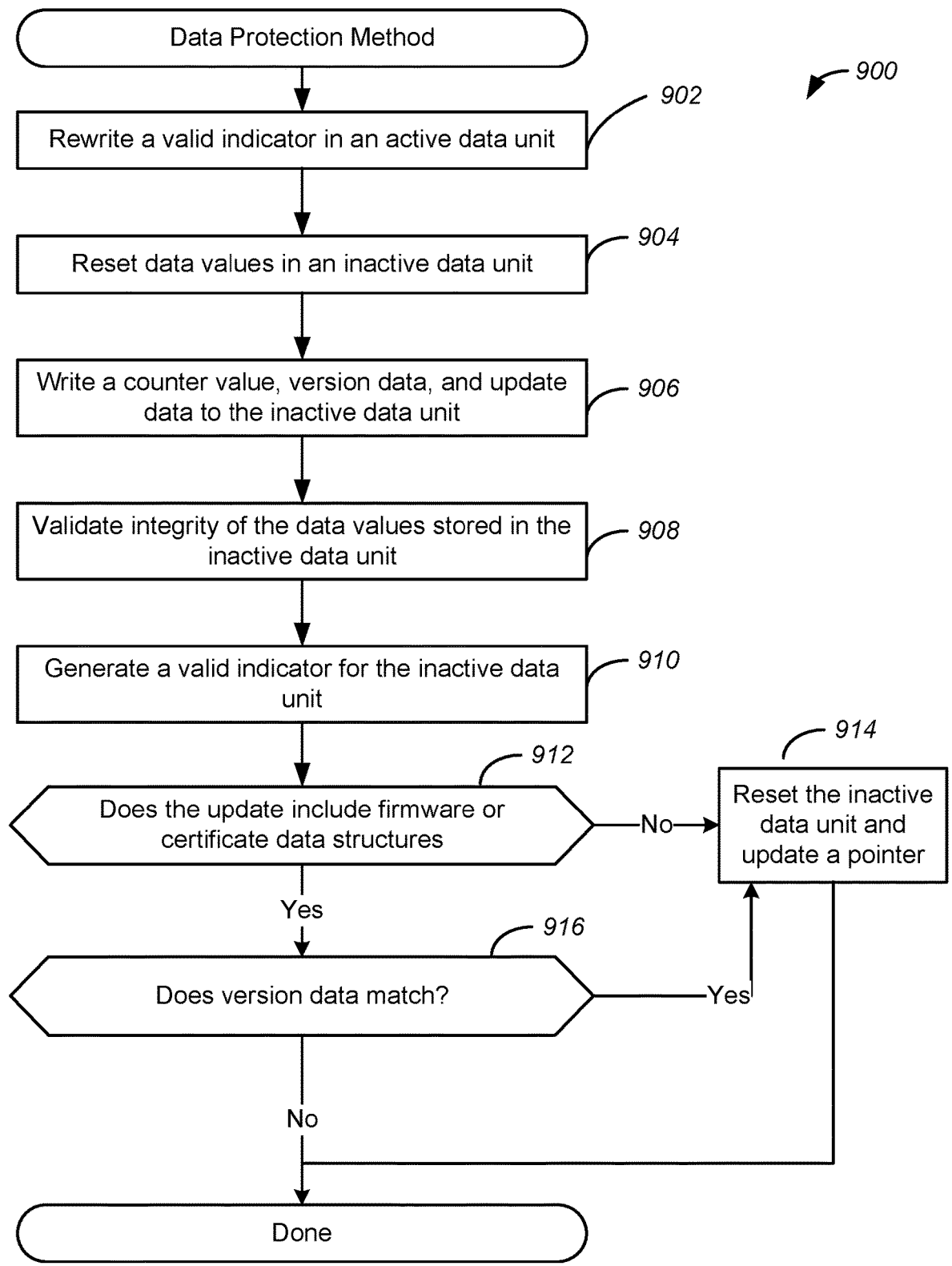
FIG. 9 illustrates a flow chart of another example of a method for data protection, performed in accordance with some embodiments.

FIG. 9 illustrates a flow chart of another example of a method for data protection, performed in accordance with some embodiments. As will be discussed in greater detail below, a method, such as method 900, may be performed to implement update operations for a memory device that may be a secure memory device that may, for example, include security data, such as a certificate data structure and a firmware data structure. As similarly discussed above, such update operations may be performed for each of a certificate as well as firmware data. Accordingly, as will be discussed in greater detail below, an iteration of portions of method 900 may be performed for a certificate or other security verification data structure, and another iteration of portions of method 900 may be performed for the firmware in its respective data field.

Method 900 may perform operation 902 during which a valid indicator in an active data unit may be rewritten. In various embodiments, the valid indicator is a security or verification code computed based, at least in part, on contents of a metadata data field for a first data unit which may currently be identified as an active data unit based, for example, on a command count value. In one example, the valid indicator may be a hash value computed based on contents of the special data and its associated metadata. During operation 902, this hash value may be recomputed and rewritten into the active data unit to refresh the valid indicator of the first data unit.

Method 900 may perform operation 904 during which data values in an inactive data unit may be reset. In various embodiments, resetting the inactive data unit confirms that a reset operation has been performed, and ensures that only one active version of the special data exists, thus complying with security standards. Accordingly, a second data unit may be identified as the inactive data unit, and values of the second data unit may be reset. Accordingly, both metadata and special data may have a designated reset code written to them, such as "FF". It will be appreciated that any suitable reset code that is recognized by a system component, such as a memory controller, may be used for the reset data values.

Method 900 may perform operation 906 during which a counter value, version data, and update data may be written to the inactive data unit. Accordingly, during operation 906, the count value may be updated to identify an incremented value. As similarly discussed above, the count value may be obtained from a command counter. Moreover, version data, such as a version, included in the update data may also be written to its corresponding field in the inactive data unit. In various embodiments, the version data identifies a version for special data included in the update. Moreover, the special data included in the update may also be written to its corresponding data field as updated data.

Method 900 may perform operation 908 during which integrity of the data values stored in the inactive data unit may be validated. In various embodiments, the validation may be performed in accordance with validation and/or verification procedures defined by a security standard. For example, such validation operations for data integrity may include checking an error-detecting code, or some other data integrity data values determined and computed in accordance with a memory security standard.

Method 900 may perform operation 910 during which a valid indicator may be generated for the inactive data unit. Accordingly, as similarly discussed above, a hash value may be computed and stored as a valid indicator for the inactive data unit. The hash value may be computed based on the newly updated data. Accordingly, the computed hash value is also an updated valid indicator.

Method 900 may perform operation 912 during which it may be determined if the update further includes firmware or certificate data structures. Accordingly, operations 902-910 may have been performed for the special data, and operation 912 may be performed to determine if additional update operations should be performed for both the certificate and firmware data structures. Such a determination may be made based, among other things, on whether or not the update includes a certificate or firmware data structure, as may be determined based on one or more identifiers included in the update configured to identify these types of data structures.

Accordingly, the contents of the update may be analyzed, and if it is determined that the update does not include firmware or certificate data structures, method 900 may proceed to operation 914 during which the inactive data unit may be reset, and a pointer may be updated to identify the active data unit.

Figure 10A:
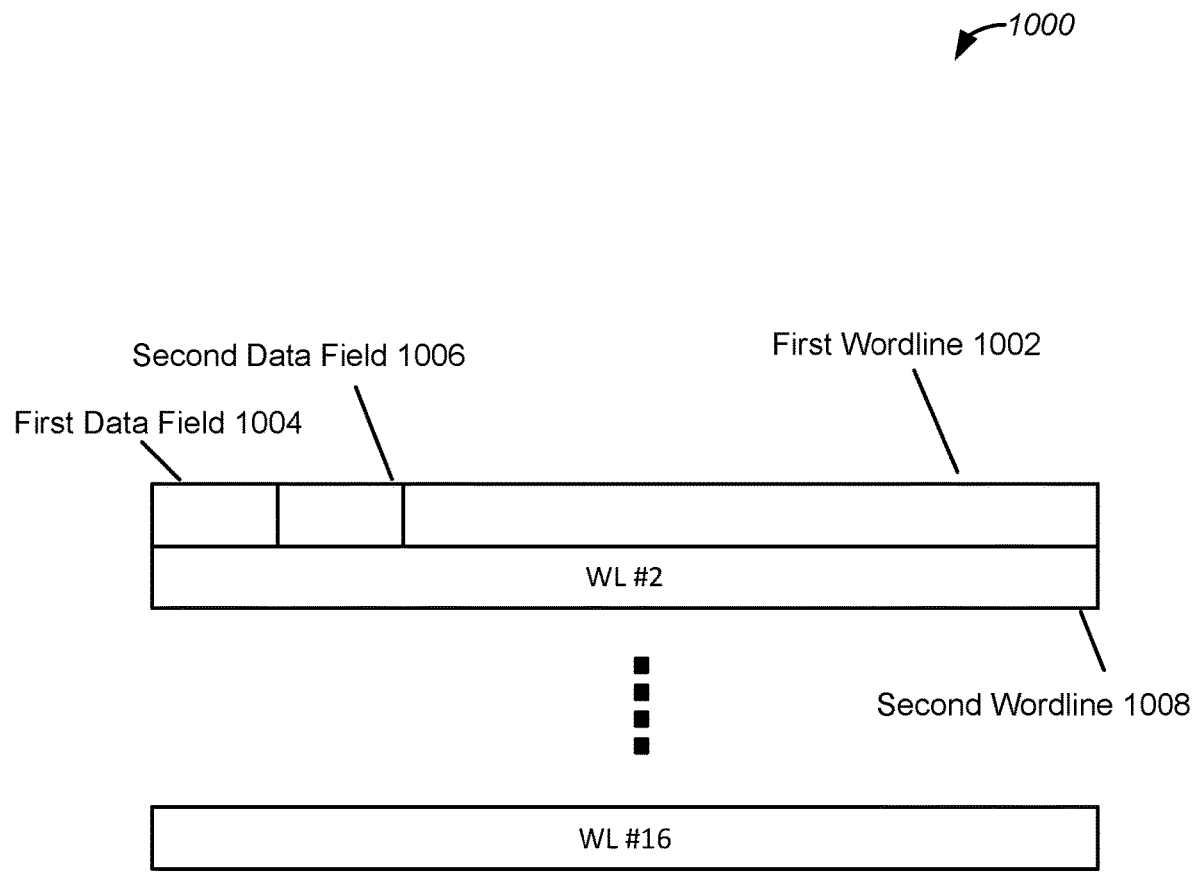
FIG. 10A illustrates a diagram of an example an erase sector, configured in accordance with some embodiments.

If, during operation 912, it is determined that the update does include firmware or certificate data structures, method 900 may proceed to operation 916 during which version data of the firmware or certificate may be verified. As will be discussed in greater detail below, a version identified in the updated data may be compared against version data stored in a secure storage location. Accordingly, the version data of the firmware or certificate may be compared against the version data stored in the secure storage location which provides reference version data for such comparisons. If it is determined that the versions match, method 900 may proceed to operation 914 discussed above. If it is determined that the versions do not match method 900 may terminate. In one example, resetting of the inactive data unit may occur after an additional update operation that may be associated with another data structure, such as another certificate or firmware. version FIG. 10A illustrates a diagram of an example an erase sector, configured in accordance with some embodiments. As will be discussed in greater detail below, erase sector 1000 illustrates storage of metadata and special data in a flash memory device in which data and memory operations are managed using erase sectors. As shown in FIG. 10A, an erase sector, such as erase sector 1000, may include several wordlines configured to store data. In one example, erase sector 1000 includes 16 wordlines. In some embodiments, first wordline 1002 is configured to store metadata. For example, first wordlines 1002 may include data fields such as first data field 1004 configured to store a count value, and second data field 1006 configured to store a valid indicator. Moreover, erase sector 1000 may include additional wordlines, such as second wordline 1008 that is configured to store data which may be the target of various update operations.

Figure 10B:
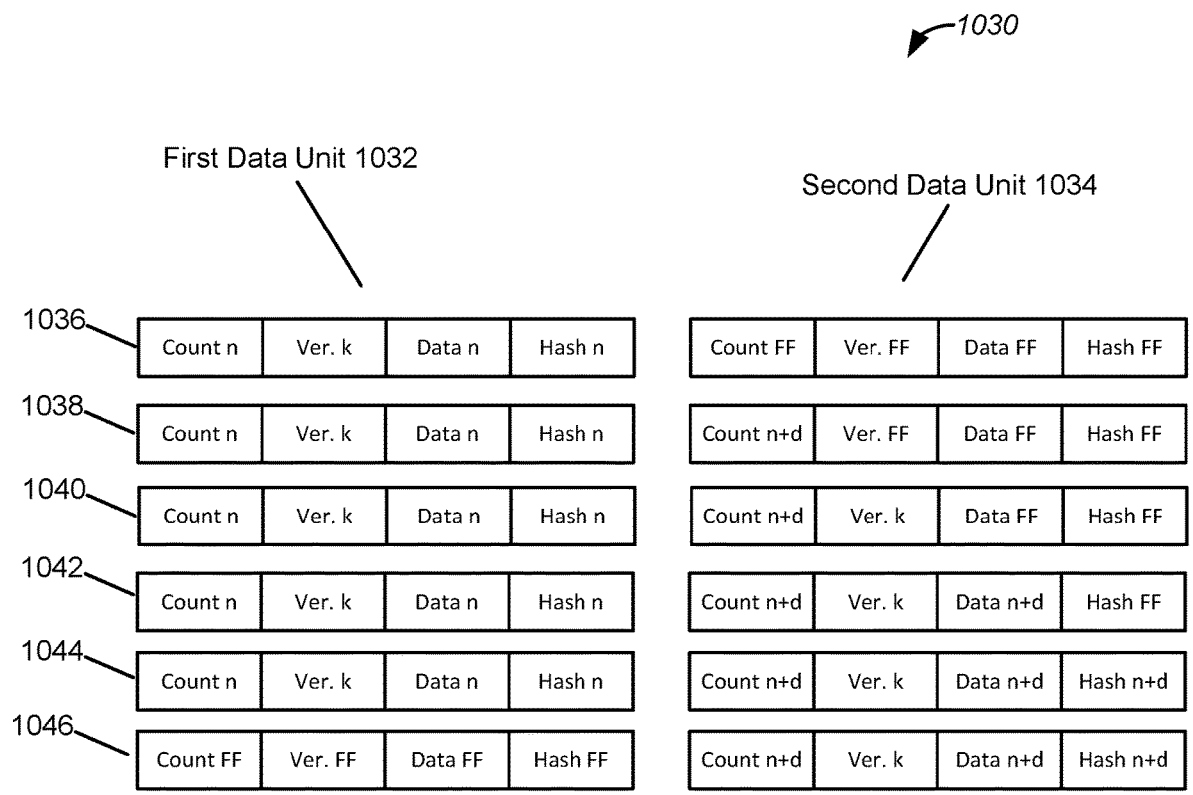
FIG. 10B illustrates a diagram of a progression of data included in data fields during an update of special data in accordance with some embodiments.

FIG. 10B illustrates a diagram of a progression of data included in data fields during an update of special data in accordance with some embodiments. As will be discussed in greater detail below, diagram 1030 illustrates update operations associated with a secure system where an update includes new data, but not a new version updated associated with firmware or a certificate. More specifically, diagram 1030 illustrates data included in data fields during special data operations such as those described above with reference to FIG. 9. As shown in FIG. 10B, diagram 1030 illustrates first data unit 1032 and second data unit 1034. In this example first data unit 1032 is a currently active data unit, and second data unit 1034 is an inactive data unit. During first operation 1036, a first valid indicator is rewritten to first data unit 1032, and second data unit 1034 is reset. As similarly discussed above, the first valid indicator may be a computed hash value. During second operation 1038, a count value of second data unit 1034 is incremented. During third operation 1040, a version of second data unit 1034 is updated. During fourth operation 1042, special data included in second data unit 1034 is updated. During fifth operation 1044, a second valid indicator is written to second data unit 1034 thus activating second data unit 1034. As discussed above, second valid indicator may be a second hash value computed based on the updated data. During sixth operation 1046, the contents of first data unit 1032 may be reset by writing a reset code to the contents of first data unit 1032.

Figure 11:
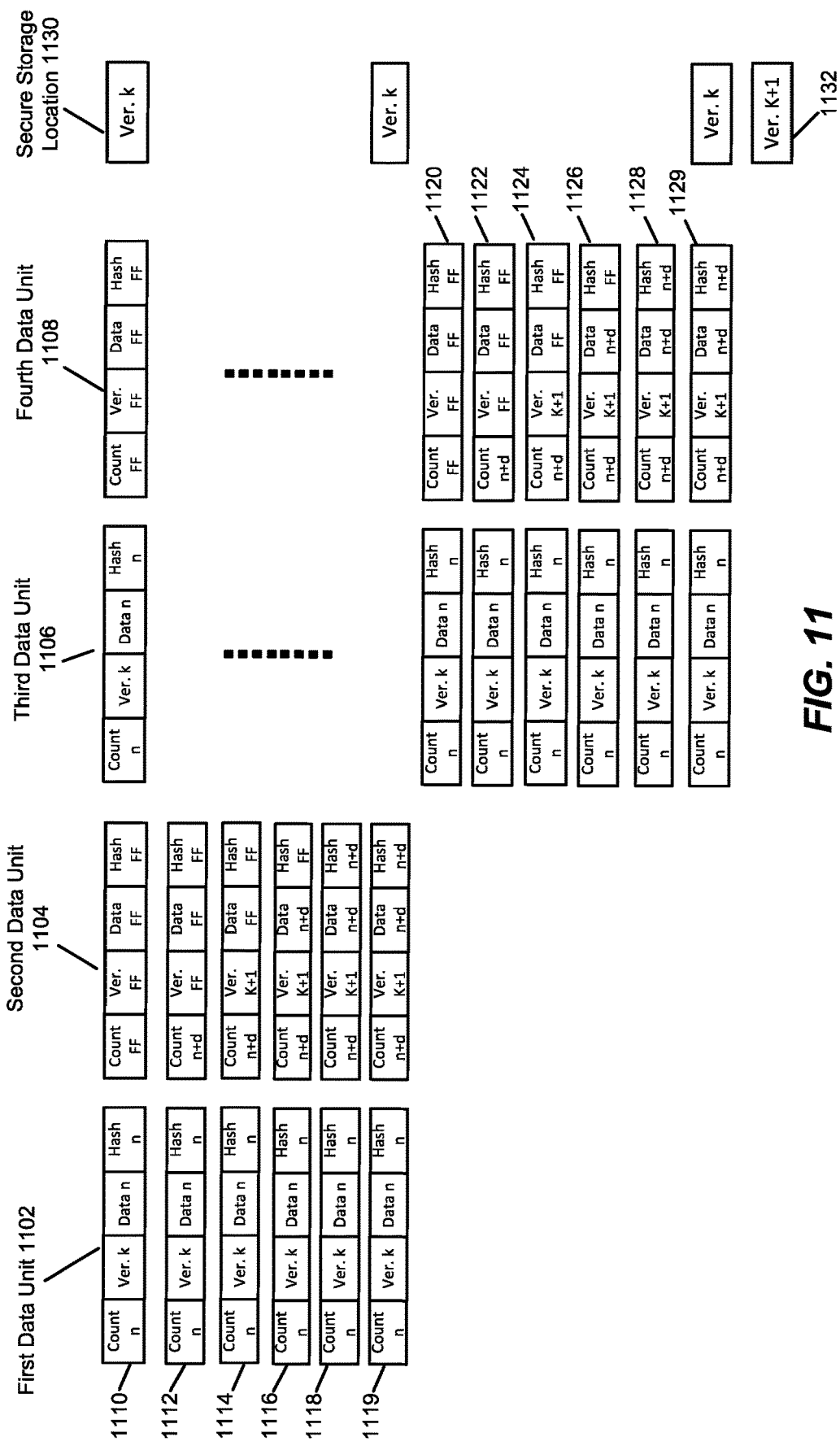
FIG. 11 illustrates a diagram of a progression of data included in data fields during an update of a certificate and firmware in accordance with some embodiments.

FIG. 11 illustrates a diagram of a progression of data included in data fields during an update of a certificate and firmware in accordance with some embodiments. As will be discussed in greater detail below, diagram 1100 illustrates update operations associated with a secure system where an update includes new versions of firmware and a certificate. Accordingly, consecutive iterations of update methods are performed for each of the firmware and certificate, and data is not reset or erased until the end of each respective update method. More specifically, diagram 1100 illustrates data included in data fields during certificate and firmware operations such as those described above with reference to FIG. 9. As shown in FIG. 11, diagram 1100 illustrates first data unit 1102 and second data unit 1104 for a certificate data structure. Diagram 1100 also illustrates third data unit 1106 and fourth data unit 1108 for a firmware data structure. In this example first data unit 1102 is a currently active data unit for the certificate, and second data unit 1104 is an inactive data unit for the certificate. Moreover, third data unit 1106 is a currently active data unit for the firmware, and fourth data unit 1108 is an inactive data unit for the firmware.

Accordingly, during first operation 1110, a first valid indicator is rewritten to first data unit 1102, and second data unit 1104 is reset. As similarly discussed above, the first valid indicator may be a computed hash value. During second operation 1112, a count value of second data unit 1104 is incremented. During third operation 1114, a version of second data unit 1104 is updated. During fourth operation 1116, the certificate included in second data unit 1104 is updated. During fifth operation 1118, a second valid indicator is written to second data unit 1104. As discussed above, second valid indicator may be a second hash value computed based on the updated data.

Moreover, during sixth operation 1120, a third valid indicator is rewritten to third data unit 1106, and fourth data unit 1108 is reset. As similarly discussed above, the third valid indicator may be a computed hash value. During seventh operation 1122, a count value of fourth data unit 1108 is incremented. During eighth operation 1124, a version of fourth data unit 1108 is updated. During ninth operation 1126, the firmware included in fourth data unit 1108 is updated. During tenth operation 1128, a fourth valid indicator is written to fourth data unit 1108. As discussed above, fourth valid indicator may be a hash value computed based on the updated data.

As shown in FIG. 11, diagram 1100 additionally illustrates a secure storage location, such as secure storage location 1130, which is configured to store a version number of the firmware that may be used as a reference version number for special data stored in the data units. For example, a version number stored in secure storage location 1130 may be compared against a version number of second data unit 1104 during operation 1119, and a version umber stored in secure storage location 1130 may be compared against a version number of fourth data unit 1108 during operation 1129. Such comparison operations may be performed to verify which data units have the correct version number, and to activate data units with matching version numbers. In some embodiments, the version number included in secure storage location 1130 may be updated last, thus activating the data units via such an update. For example, version numbers stored in second data unit 1104 and fourth data unit 1108 may have been updated to k+1 during operations 1114 and 1124 respectively. Once the operations associated with the data units have been completed, the version number stored in secure storage location 1130 may be updated during operation 1132 so that the most recent version number is stored in secure storage location 1130, and second data unit 1104 and fourth data unit 1108 are now activated because their version numbers now match.

Figure 12:
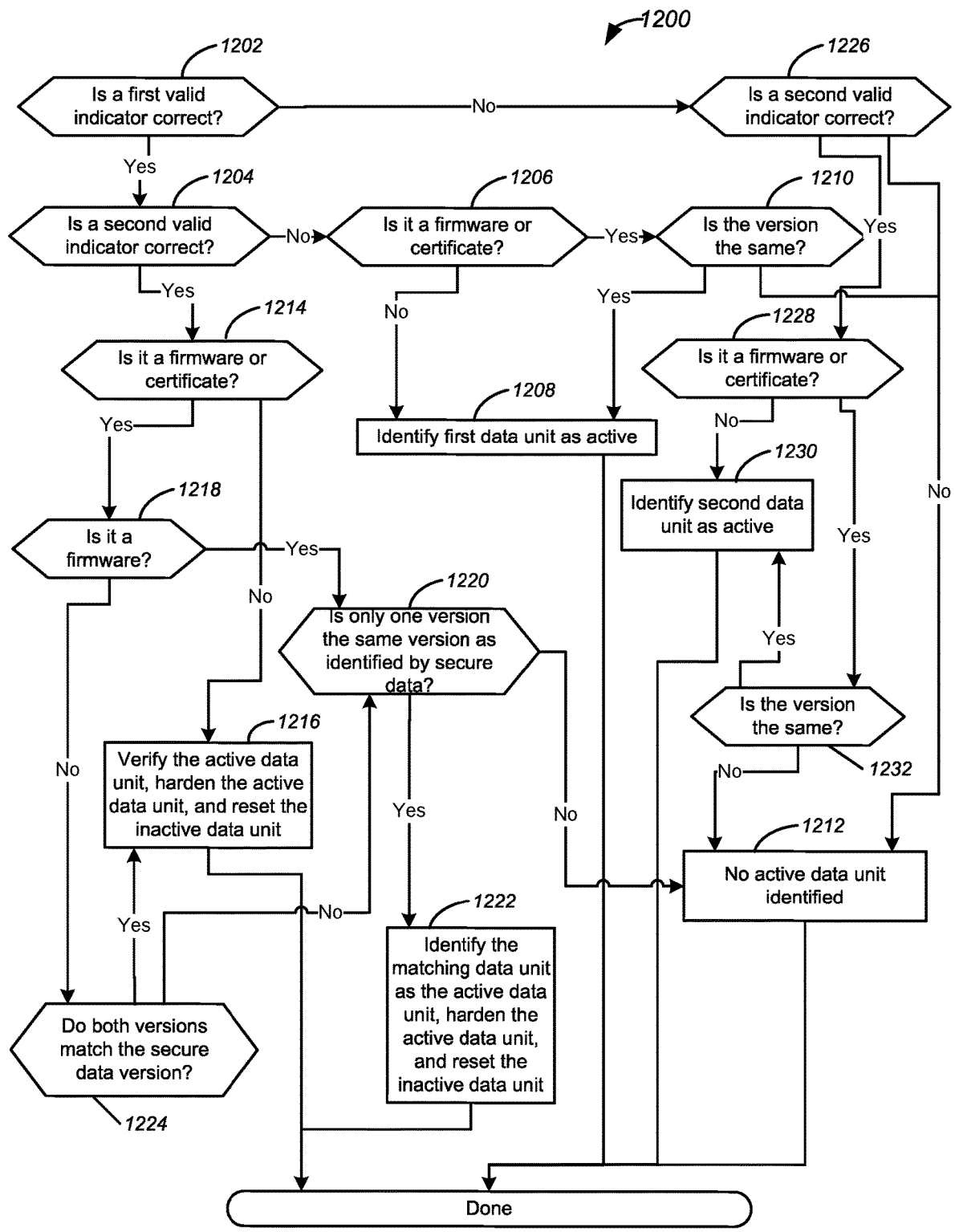
FIG. 12 illustrates a flow chart of another example of a method for data protection, performed in accordance with some embodiments.

FIG. 12 illustrates a flow chart of another example of a method for data protection, performed in accordance with some embodiments. As will be discussed in greater detail below, a method, such as method 1200, may be performed to identify an active data unit and to read data values from an active data unit. Moreover, as will be discussed in greater detail below, method 1200 may also be performed to identify one or more error states, such as no active data unit being identified. Accordingly, data read from the data units may be used to determine if there is a memory error and if a power loss event has occurred.

Method 1200 may perform operation 1202 during which it may be determined if a first valid indicator is correct. As similarly discussed above, the first valid indicator may be a first hash value stored in a first data unit. Accordingly, the first hash value may be recomputed and compared against the hash value stored in the first data unit. If it is determined that the first valid indicator has been computed and stored correctly, method 1200 may proceed to operation 1204.

Accordingly, during operation 1204 it may be determined if a second valid indicator is correct. As similarly discussed above, the second valid indicator may be a second hash value stored in a second data unit. Thus, the second hash value may be recomputed and compared against the hash value stored in the second data unit. If it is determined that the second valid indicator has not been computed and stored correctly, method 1200 may proceed to operation 1206.

During operation 1206 it may be determined if the data unit being analyzed includes a data structure associated with firmware or a certificate. As similarly discussed above, such a determination may be made based on known sector information, such as a mapping of sectors. Accordingly, if it is determined that the data units being analyzed are not associated with firmware or a certificate, method 1200 may proceed to operation 1208 where the first data unit may be identified as an active data unit, and data may be read from the first data unit. Moreover, if it is determined that the data units being analyzed are associated with firmware or a certificate, method 1200 may proceed to operation 1210.

Accordingly, during operation 1210, it may be determined if a version of the firmware and/or certificate matches a version stored in a secure location, as similarly discussed above. Thus, the versions may be compared to determine if they match. If it is determined that the version is the same, method 1200 may proceed to operation 1208, where the first data unit may be identified as an active data unit, and data may be read from the first data unit. If it is determined that the version does not match, method 1200 may perform operation 1212 during which it may be determined that no valid active data unit has been found. Moreover, one or more error messages may be generated, as similarly discussed above.

Returning to operation 1204, if it is determined that the second valid indicator is correct, method 1200 may proceed to operation 1214 where it may be determined if the data unit being analyzed includes a data structure associated with firmware or a certificate. As similarly discussed above, such a determination may be made based on known sector information, such as a mapping of sectors. Accordingly, if it is determined that the data units being analyzed are not associated with firmware or a certificate, method 1200 may proceed to operation 1216 where a data unit with a higher count value may be identified as an active data unit. Data values included in the active data unit may be refreshed to harden them, and reset values may be written to the inactive data unit. It will be appreciated that one or more additional read operations may be performed to read data from the active unit. Returning to operation 1214, if it is determined that the data units being analyzed are associated with firmware or a certificate, method 1200 may proceed to operation 1218.

Accordingly, during operation 1218, it may be determined if the data units being analyzed are associated with firmware. As similarly discussed above, the data units may be associated with firmware and/or a certificate, and during operation 1218 it may be determined if they are associated with firmware in particular. As also discussed above, such a determination may be made based on known sector information. Accordingly, if it is determined that the data units being analyzed are associated with firmware, method 1200 may proceed to operation 1220.

Therefore, during operation 1220, it may be determined if one of the firmware version numbers stored in the special data is the same as a version number stored in a corresponding secure storage location. If one of the firmware versions does match the version of stored in the secure storage location, then method 1200 may proceed to operation 1222 where the matching firmware version may be used to identify the active data unit and any suitable read operations may be performed. Moreover, the data included in the active data unit may be hardened, and a reset code may be written to the inactive data unit. If neither or both of the firmware versions match, method 1200 may proceed to operation 1212 where no active data unit is identified.

Returning to operation 1218, if it is determined that the data units are not associated with firmware, method 1200 may proceed to operation 1224 where it may be determined if the versions for both data units match a version of the secure data, also referred to herein as special data. As similarly discussed above, such a determination may be made based on a retrieval and comparison of the versions in the different data structures. If it is determined that both of the versions do not match that of the special data, method 1200 may proceed to operation 1220 discussed above to see if either one of the versions matches. If it is determined that both of the versions do match, method 1200 may proceed to operation 1216 where any suitable read, hardening, and reset operations may be performed. In some embodiments, a data unit with a higher count value may also be identified as an active data unit.

Returning to operation 1202, if it is determined that the first valid indicator is not correct, method 1200 may proceed to operation 1226 where it may be determined if the second valid indicator is correct. As similarly discussed above, such a determination may be made based on a computation and comparison of hash values. If it is determined that the second valid indicator is not correct, method 1200 may proceed to operation 1212 where no active data unit is identified and one or more error messages may be generated.

If it is determined that the second valid indicator is correct, method 1200 may proceed to operation 1228 where it may be determined if the data units being analyzed include data structures associated with firmware or a certificate. As similarly discussed above, such a determination may be made based on known sector information, such as a mapping of sectors. Accordingly, if it is determined that the data units being analyzed are not associated with firmware or a certificate, method 1200 may proceed to operation 1230 where the second data unit may be identified as an active data unit, and data may be read from the second data unit. If it is determined that the data units being analyzed include data structures associated with firmware or a certificate, method 1200 may proceed to operation 1232.

Accordingly, during operation 1232, it may be determined if a version of the firmware and/or certificate matches a version stored in a secure storage location. Thus, the versions may be compared to determine if they match. If it is determined that the versions are the same, method 1200 may proceed to operation 1230 where the second data unit may be identified as an active data unit, and data may be read from the second data unit. If it is determined that the versions are not the same, method 1200 may proceed to operation 1212 during which it may be determined that no valid active data unit has been found. Moreover, one or more error messages may be generated, as similarly discussed above.

Figure 13:
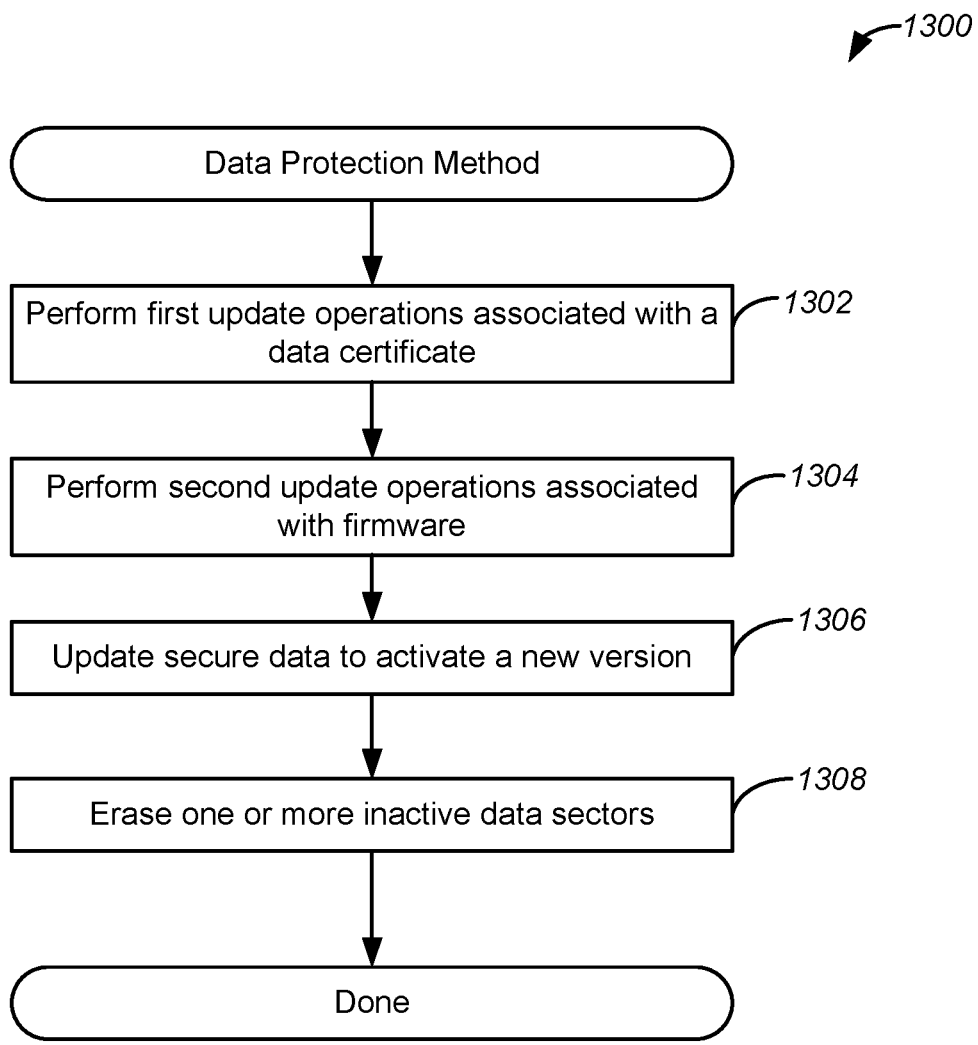
FIG. 13 illustrates a flow chart of another example of a method for data protection, performed in accordance with some embodiments.

FIG. 13 illustrates a flow chart of another example of a method for data protection, performed in accordance with some embodiments. As will be discussed in greater detail below, a method, such as method 1300, may be performed to implement update operations for a memory device that may be a secure flash memory device. Accordingly, data stored in the memory device may include security data, such as a certificate data structure. Moreover, the security data may also include a firmware data structure. Accordingly, a data may include the previously described special data and its associated metadata as well as certificate data and firmware data. As will be discussed in greater detail below, in a secure flash memory context, additional metadata columns may be used to data, such as version data, and different data structures may be implemented and managed in different memory sectors.

Method 1300 may perform operation 1302 during which first update operations associated with a data certificate may be performed. As will be discussed in greater detail below, the first update operations may be determined based on update data associated with the data certificate. More specifically, during operation 1302, first update operations may be determined and implemented for a certificate data structure. As will be discussed in greater detail below, the first update operations may be determined in response to a firmware version being updated, and for a first data structure type, such as a certificate data structure.

Method 1300 may perform operation 1304 during which second update operations associated with firmware may be performed. As will be discussed in greater detail below, the second update operations may be determined based on update data associated with the firmware. More specifically, during operation 1304, second update operations may be determined and implemented for a firmware data structure. As will be discussed in greater detail below, the second update operations may be determined in response to a firmware version being updated, and for a second data structure type, such as a firmware data structure. In various embodiments, the firmware data structure is stored in a different memory sector than the certificate data structure.

Method 1300 may perform operation 1306 during which secure data may be updated and a new version may be activated. Accordingly, new data included in an update may be used to update the secure data, and if included, a new certificate and a new firmware data structure may be also be updated. As similarly discussed above and as will be discussed in greater detail below, version data associated with the updated data structures may be updated as well such that they match version data number stored in a secure storage location and used as reference for the version numbers written in the special structure metadata. Once the updated version number matches the reference version number, the updated data structures may be activated.

Method 1300 may perform operation 1308 during which one or more inactive data sectors may be erased. In some embodiments, the sectors of the now inactive data unit used to store the certificate and firmware may be reset by, for example, erasing the data unit. Such resetting and overwriting of previous security data may be performed for compliance with one or more security standards associated with secure data storage.

Figure 14:
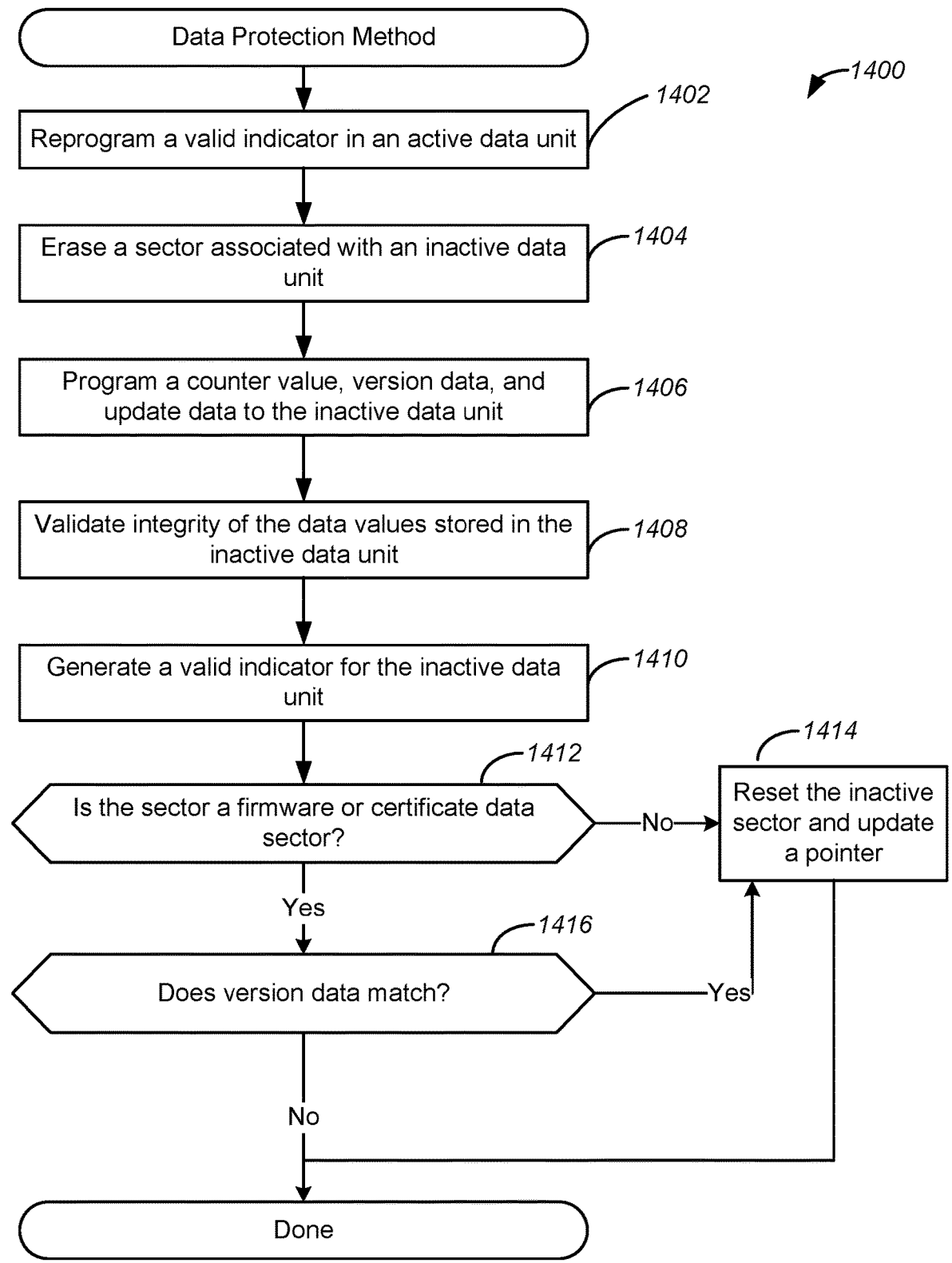
FIG. 14 illustrates a flow chart of another example of a method for data protection, performed in accordance with some embodiments.

FIG. 14 illustrates a flow chart of another example of a method for data protection, performed in accordance with some embodiments. As will be discussed in greater detail below, a method, such as method 1400, may be performed to implement update operations for a memory device that may be a secure flash memory device that may include security data, such as a certificate data structure and a firmware data structure. In various embodiments, the memory device may be a secure memory flash device that uses erase sectors for erase operations. Accordingly, method 1400 may be performed to support update operations for secure data in a flash memory context.

Method 1400 may perform operation 1402 during which a valid indicator in an active data unit may be reprogrammed. As similarly discussed above, the valid indicator is a security or verification code computed based, at least in part, on contents of a metadata wordline for a first data unit which may currently be identified as an active data unit based, for example, on a command count value. In one example, the valid indicator may be a hash value computed based on contents of the special data and its associated metadata. During operation 1402, this hash value may be recomputed and reprogrammed into the active data unit to refresh the valid indicator of the first data unit. As similarly discussed above, in the context of a flash memory device, a data unit may be a data sector.

Method 1400 may perform operation 1404 during a sector associated with an inactive data unit may be erased. As similarly discussed above, erasing the inactive data unit confirms that an erase operation has been performed, and ensures that only one active version of the special data exists, thus complying with security standards. Accordingly, a second data unit may be identified as the inactive data unit, and a sector that includes the inactive data unit may be erased. It will be appreciated that the active data unit is implemented in a different sector. Accordingly, both metadata and data wordlines may be erased by implementation of an erase command.

Method 1400 may perform operation 1406 during which a counter value, version data, and update data may be programmed to the inactive data unit. Accordingly, during operation 1406, the command count value may be updated to identify an incremented value. Moreover, version data, such as a version, included in the update data may also be programmed to its corresponding field in the inactive data unit. In various embodiments, the version data identifies a version for special data included in the update. Moreover, the special data included in the update may also be programmed to its corresponding data field as updated data.

Method 1400 may perform operation 1408 during which integrity of the data values stored in the inactive data unit may be validated. In various embodiments, the validation may be performed in accordance with validation and/or verification procedures defined by a security standard. For example, such validation operations for data integrity may include checking an error-detecting code, or some other data integrity data values determined and computed in accordance with a memory security standard.

Method 1400 may perform operation 1410 during which a valid indicator may be generated for the inactive data unit. Accordingly, as similarly discussed above, a hash value may be computed and programmed as a valid indicator for the inactive data unit. The hash value may be computed based on the newly updated data. Accordingly, the computed hash value is also an updated valid indicator.

Method 1400 may perform operation 1412 during which it may be determined if the update includes updated data for a firmware sector and/or a certificate sector. Accordingly, operations 1402-1410 may have been performed for a sector including special data, and operation 1412 may be performed to determine if additional update operations should be performed for sectors associated with the certificate and firmware data structures. Such a determination may be made based, among other things, on whether or not the update includes a certificate or firmware data structure, as may be determined based on one or more identifiers included in the update configured to identify these types of data structures. Such a determination may also be made based on one or more sector identifiers. For example, sectors may be identified by the system as certificate sectors and firmware sectors, and such information may be stored by the system as a mapping or look up table. In various embodiments, target sectors of the update, as determined based on one or more identifiers or address locations, may be used to determine if update data is to be programmed to any certificate sectors or firmware sectors. Thus, the contents of the update may be analyzed, and if it is determined that the update does not include firmware or certificate data updates, method 1400 may proceed to operation 1414 during which a pointer may be updated, and the first data unit may be erased.

If, during operation 1412, it is determined that the update does include firmware or certificate data updates, method 1400 may proceed to operation 1416 during which version data of the firmware or certificate data structure may be verified. As similarly discussed above, such verification may be performed based on whether or not version number of the firmware or certificate matches reference version number stored in a secure storage location. If it is determined that the version numbers match, method 1400 may proceed to operation 1414 discussed above. Moreover, if, during operation 1416, it is determined that the update includes a new version number and the version numbers do not match, method 1400 may terminate.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:
1. A system comprising:
a non-volatile memory device comprising:
  a first data unit comprising a first plurality of memory cells configured to store data for the non-volatile memory device and associated metadata;
  a second data unit comprising a second plurality of memory cells configured to store data for the non-volatile memory device and associated metadata, wherein the first data unit and second data unit are configured to alternate storing a most recent version of the data and associated metadata, and wherein the data comprises configuration data for the non-volatile memory device; and control circuitry comprising implemented logic configured to:
read metadata from the first data unit and the second data unit;
identify the first data unit as an inactive data unit based on contents of the first data unit and the second data unit; and
perform one or more update operations such that the first data unit is updated and set as an active unit when the update operations are complete, wherein the active unit is a currently active data unit used to store current configuration data for the non-volatile memory device.

2. The system of claim 1, wherein the one or more update operations comprise:
storing update data in the first data unit;
incrementing a count value stored in the first data unit to determine it is the active data unit;
activating the first data unit; and
resetting the second data unit.

3. The system of claim 2, wherein the update data is included in an update data object received by the control circuitry.

4. The system of claim 1, wherein the first data unit is identified based on count values included in the metadata stored in the first data unit and the metadata stored in the second data unit.

5. The system of claim 1, wherein the control circuitry is further configured to:
generate an error message in response to determining that there is no active data unit.

6. The system of claim 1, wherein the control circuitry is further configured to:
generate an error message indicating that a power loss event has occurred.

7. The system of claim 1, wherein the data is configuration data comprising a certificate data structure and a firmware data structure.

8. The system of claim 7, wherein each of the certificate data structure and a firmware data structure comprise version data and a valid indicator.

9. The system of claim 8, wherein the valid indicator is a hash value computed based, at least in part, on the metadata.

10. A method comprising:
reading, using control circuitry comprising implemented logic, metadata from a first data unit and a second data unit, the first data unit comprising a first plurality of memory cells, the second data unit comprising a second plurality of memory cells, the first data unit and the second data unit storing data for a non-volatile memory device and associated metadata, wherein the data comprises configuration data for the non-volatile memory device;
identifying, using the control circuitry, the first data unit as an inactive data unit based on contents of the first data unit and the second data unit; and
performing, using the control circuitry, one or more update operations such that the first data unit is updated and set as an active unit when the one or more update operations are complete, wherein the active unit is a currently active data unit used to store current configuration data for the non-volatile memory device.

11. The method of claim 10, wherein the one or more update operations further comprise:
storing update data in the first data unit;
incrementing a count value stored in the first data unit to determine it is the active data unit;
activating the first data unit; and
resetting the second data unit.

12. The method of claim 10, wherein the identifying of the first data as the inactive data unit further comprises:
retrieving count values included in the metadata stored in the first data unit and the metadata stored in the second data unit; and
determining the count value of the first data unit is lower than the count value of the second data unit.

13. The method of claim 10 further comprising:
generating an error message indicating that a power loss event has occurred.

14. The method of claim 10, wherein the data is configuration data comprising at least one of a certificate data structure and a firmware data structure.

15. The method of claim 14, wherein each of the certificate data structure and the firmware data structure comprise version data and a valid indicator, and wherein the valid indicator is a hash value computed based, at least in part, on the metadata.

16. A device comprising:
a non-volatile memory array comprising:
a first data unit comprising a first plurality of memory cells configured to store data for the non-volatile memory array and associated metadata;
a second data unit comprising a second plurality of memory cells configured to store data for the non-volatile memory device and associated metadata, wherein the first data unit and second data unit are configured to alternate storing a most recent version of the data and associated metadata, and wherein the data comprises configuration data for the non-volatile memory device; and
one or more processors configured to:
read metadata from the first data unit and the second data unit;
identify the first data unit as an inactive data unit based on contents of the first data unit and the second data unit; and
perform one or more update operations such that the first data unit is updated and set as an active unit when the one or more update operations are complete, wherein the active unit is a currently active data unit used to store current configuration data for the non-volatile memory device.

17. The device of claim 16, wherein the one or more update operations comprise:
storing update data in the first data unit;
incrementing a count value stored in the first data unit to determine it is the active data unit;
activating the first data unit; and
resetting the second data unit.

18. The device of claim 16, wherein the first data unit is identified based on count values included in the metadata stored in the first data unit and the metadata stored in the second data unit.

19. The device of claim 16, wherein the one or more processors are further configured to:
generate an error message indicating that a power loss event has occurred.

20. The device of claim 16, wherein the data is configuration data comprising a certificate data structure and a firmware data structure, wherein each of the certificate data structure and a firmware data structure comprise version data and a valid indicator, and wherein the valid indicator is a hash value computed based, at least in part, on the metadata.

* * * * *